United States Patent [19]

Kono et al.

[11] Patent Number: 5,697,867
[45] Date of Patent: Dec. 16, 1997

[54] DEVICES FOR CONTROLLING PLANT, CLUTCH SLIP, AND IDLING ENGINE SPEED AND METHODS OF CONTROLLING THE SAME

[75] Inventors: Katsumi Kono; Hiroshi Ito; Kagenori Fukumura, all of Toyota; Shinya Nakamura, Owari-Asahi; Masataka Osawa, Nagoya; Ryoichi Hibino, Aichi-ken; Masatoshi Yamada, Nagoya, all of Japan

[73] Assignees: Toyota Jidosha Kabushiki Kaisha, Toyota; Kabushiki Kaisha Toyota Chuo Kenkyusho, Aichi-ken, both of Japan

[21] Appl. No.: 396,002

[22] Filed: Feb. 28, 1995

[30] Foreign Application Priority Data

Jun. 9, 1994 [JP] Japan ................. 6-152829

[51] Int. Cl.⁶ .................... F16D 48/12; G05B 13/04; F02D 41/16
[52] U.S. Cl. .................... 477/176; 364/150; 364/157; 123/339.2
[58] Field of Search .................... 477/176, 169; 364/150, 157, 424.1, 424.01

[56] References Cited

U.S. PATENT DOCUMENTS

| | | | |
|---|---|---|---|
| 4,634,946 | 1/1987 | Moulds, III et al. | 364/561 |
| 4,639,853 | 1/1987 | Rake et al. | 364/149 |
| 4,706,790 | 11/1987 | Lockhart et al. | 477/169 |
| 4,757,886 | 7/1988 | Brown et al. | |
| 5,121,820 | 6/1992 | Brown et al. | |
| 5,202,833 | 4/1993 | Fodale | 477/176 |
| 5,275,267 | 1/1994 | Slicker | |
| 5,322,150 | 6/1994 | Schmidt-Brücken et al. | 477/176 |
| 5,404,289 | 4/1995 | Hang et al. | 364/148 |
| 5,406,474 | 4/1995 | Hansen | 364/148 |
| 5,474,506 | 12/1995 | Palansky et al. | 477/63 |
| 5,480,363 | 1/1996 | Matsubara et al. | 477/63 |
| 5,527,238 | 6/1996 | Hrovat et al. | 477/166 |

FOREIGN PATENT DOCUMENTS

| | | |
|---|---|---|
| 60-143268 | 7/1985 | Japan . |
| 63-67461 | 3/1988 | Japan . |

*Primary Examiner*—Andrew M. Dolinar
*Attorney, Agent, or Firm*—Oblon, Spivak, McClelland, Maier & Neustadt, P.C.

[57] ABSTRACT

The present invention realizes high-speed and stable controls irrespective of the characteristic perturbations accompanied with the variation in operation point of a plant. The principle of the invention is applied to slip control of a lock-up clutch of a transmission and to idling engine speed control. A plant input calculation unit OC working as a controller recognizes an actual plant plus a characteristic compensator CC as an augmented plant EOB. The characteristic compensator CC compensates for the characteristic perturbations of the augmented plant EOB accompanied with the variation in operation point, so that the augmented plant EOB always works at a design point with respect to the plant input calculation unit OC working as the controller. The characteristic compensator CC compensates for frequency-dependent gain and phase deviations through filter operations and for a stationary gain deviation by multiplying predetermined constants.

13 Claims, 35 Drawing Sheets

32: LOCK-UP CLUTCH (DIRECT CLUTCH)
42: ELECTRONIC CONTROL UNIT (SLIP CONTROL DEVICE)
90: ENGINE SPEED SENSOR (ENGINE SPEED DETECTING MEANS)

Fig. 9A

| NSLP* (rpm) | 50 | 150 | 250 | 350 | 450 |
|---|---|---|---|---|---|
| $\alpha 1$ | 0 | 0 | 2 | 3 | 4 |
| $\beta 1$ | 1 | 1 | 0.8 | 0.6 | 0.4 |

Fig. 9B

| Qn (g/rev) | 0.2 | 0.4 | 0.6 | 0.8 | 1.0 |
|---|---|---|---|---|---|
| $\alpha 2$ | 1 | 1 | 0.5 | 0 | 0 |
| $\beta 2$ | 1 | 1 | 1.2 | 1.3 | 1.4 |

Fig. 9C

| Nin (rpm) | 1000 | 1200 | 1400 | 1600 | 1800 |
|---|---|---|---|---|---|
| $\alpha 3$ | 1 | 0.75 | 0.25 | 0 | 0 |
| $\beta 3$ | 0.9 | 1 | 1.2 | 1.3 | 1.4 |

Time (sec.)

Fig. 28A

INPUT SHAFT ROTATING SPEED Nin

α  Nin=1000

| NSLP* / Qn | 50 | 150 | 250 | 350 | 450 |
|---|---|---|---|---|---|
| 0.2 | 0.2 | 0 | −0.5 | −1 | −1 |
| 0.4 | 0.2 | 0 | −0.6 | −1 | −1 |
| 0.6 | 0.5 | 0.4 | 0.2 | 0 | 0 |
| 0.8 | 0.8 | 0.5 | 0.3 | 0.1 | 0 |

Nin=1200
Nin=1800

Fig. 28B

β  Nin=1000rpm

| NSLP* / Qn | 50 | 150 | 250 | 350 | 450 |
|---|---|---|---|---|---|
| 0.2 | 0.8 | 0.5 | 0.5 | 0.5 | 0.5 |
| 0.4 | 0.8 | 0.8 | 0.5 | 0.5 | 0.5 |
| 0.6 | 1.4 | 0.9 | 0.6 | 0.5 | 0.5 |
| 0.8 | 1.6 | 1.2 | 1 | 1 | 0.8 |

Nin=1200
Nin=1800

Fig. 38 A

| Nid* (rpm) | 750 | 850 | 950 | 1050 | 1150 |
|---|---|---|---|---|---|
| $\alpha 1$ | 0 | 0 | 2 | 3 | 4 |
| $\beta 1$ | 1 | 1 | 0.8 | 0.6 | 0.4 |

Fig. 38 B

| Qn (g/rev) | 0.05 | 0.1 | 0.15 | 0.2 | 0.25 |
|---|---|---|---|---|---|
| $\alpha 2$ | 1 | 1 | 0.5 | 0 | 0 |
| $\beta 2$ | 1 | 1 | 1.2 | 1.3 | 1.4 |

Fig. 38 C

| Tw (rpm) | 0 | 20 | 40 | 60 | 80 |
|---|---|---|---|---|---|
| $\alpha 3$ | 1 | 0.75 | 0.25 | 0 | 0 |
| $\beta 3$ | 0.9 | 1 | 1.2 | 1.3 | 1.4 |

DEVICES FOR CONTROLLING PLANT, CLUTCH SLIP, AND IDLING ENGINE SPEED AND METHODS OF CONTROLLING THE SAME

BACKGROUND OF THE INVENTION

1. Field of the Invention

The present invention relates to a plant control device for determining a plant input of operation to control a certain plant to a target value, and more particularly applies the principle of the plant control device to a clutch slip control device and an idling speed control device for an internal combustion engine. Furthermore, the present invention relates to a control which provides a control in conformity with predetermined operational characteristics and even upon a perturbation of the operation characteristics exerts high-speed controllability of a controlled variable for the object to be controlled, in specific, clutch slip conditions or idling engine speed. The invention also pertains to a method of controlling a certain plant and more specifically to a method of controlling clutch slip conditions and a method of controlling the idling engine speed.

2. Description of the Related Art

With recent advancement in control technology, a variety of control devices have been proposed to allow stable and high-speed controls of various plants or objects to be controlled in a vehicle. For example, there are a variety of known clutch slip control devices including those for controlling slip conditions of a lock-up clutch of a torque converter. Such slip control devices are designed to solve contradictory problems; that is, direct connection of inputs with outputs of the torque converter transmits the vibrations of an engine directly to a transmission in a lower engine speed range, thus worsening the riding comfortability, whereas disconnection of inputs and outputs in a wide range of engine speed prevents sufficient reduction of the fuel consumption rate.

Improvement has conventionally been given to these slip control devices to reconcile the high response and control stability. One example of a proposed improvement includes a process of calculating a current plant input based on a deviation of an actual slip revolution speed from a target slip revolution speed as well as a differential and an integral of the deviation or a differential and a second differential of the deviation (JAPANESE PATENT PUBLICATION GAZETTE No. H2-586). Another example includes a process of expanding these quantities in times series to calculate an increase in the plant input (JAPANESE PATENT LAYING-OPEN GAZETTE No. S64-30966). By matching the characteristics of the control devices to those of a plant or slip adjusting mechanism, these improved control devices can stably regulate and maintain the actual slip equal to or close to a target value and realize the high response to the target value without lowering the stability.

Other systems for compensating perturbations of characteristics of a plant have also been proposed. The operation characteristics of the plant vary with a variation in driving conditions of an internal combustion engine. A known device disclosed in JAPANESE PATENT LAYING-OPEN GAZETTE No. S60-143268 detects the loading condition of the internal combustion engine and varies a control constant of slip control according to the detected loading condition. When the characteristics of the control system vary with a variation in the operating conditions, the conventional technique detects a quantity of state causing or representing the characteristic perturbation and varies the control constant according to the quantity of state, so as to maintain the sufficient control performances over a wide operation domain.

These conventional control devices have the following drawbacks:

(1) The system for varying the control constant against the characteristic perturbation of the control system generally stores the control constant as a map. A large map is, however, required to compensate for various characteristic perturbations. Such a large map requires a relatively large storage capacity, while a control device mounted on a vehicle has only a limited storage capacity for storing various control programs and data.

(2) A system for selecting one among a plurality of control constants causes a plant input to discretely vary with respect to the plant. The discrete variation in plant input results in abrupt change of the controlled variable of the plant. A possible technique to prevent the discrete variation in plant input prepares and stores a number of maps of the control constants, and interpolates the control constant every time when a different control constant is selected. This technique, however, undesirably increases the storage capacity for the maps, and moreover such interpolation may result in insufficient control performances to make the control system unstable.

(3) Another proposed technique interpolates the plant input instead of the control constant. This technique calculates a plurality of plant inputs based on the respective maps of control constants in the process of selecting a control constant, determines a weighting average of the plural plant inputs, and outputs the interpolated plant input to the control system. Calculation of the plural plant inputs takes a relatively long time, which may be greater than a sampling period. This method does not use raw data of a plant input corresponding to a specific control constant, but outputs a mathematically processed plant input to the control system. This may result in unpreferable control characteristics.

(4) These conventional devices for or methods of controlling a system where characteristics vary with time or according to the operating conditions of the plant lay stress on the stability of the control system and can accordingly not realize the high response of the control system. These conventional system cannot attain the sufficient control under any transient conditions.

These problems are found in various devices mounted on the vehicle. For example, operation characteristics of a lock-up clutch of a torque converter significantly vary with the rotating speed of its turbine. A known control device for controlling a slip of the lock-up clutch cannot realize stable and high-speed slip control over the perturbed characteristics due to a significant variation in rotating speed. When there is a significant difference in properties between individual lock-up clutches and slip-regulating hydraulic control systems or when deterioration of frictional material or operating oil varies the frictional characteristics of the lock-up clutch or μ-v characteristics of the clutch from the original design conditions to damage the stability of the slip revolution speed, the conventional control device may not stably or rapidly control the slip equal to or close to the target value. It is, however, not practical to apply the method of selecting one of the plural control constants according to the difference between the individual control systems or the time-based variation of the control system, since this conventional technique has the drawback described above.

Similar problems are also observed in an idling speed control device due to a time-based variation in valve characteristics as well as a variation in quantity of intake air consumed for idling accompanied with a change in negative pressure of the intake manifold or other driving conditions of the internal combustion engine. The internal combustion engine is not driven at a fixed speed or fixed loading but is operated over a wide dynamic range. This naturally causes a variation in operating conditions of the control system and thereby a variation in control characteristics. A fuel injection control device and an ignition timing control device (or the corresponding methods) accordingly have the problems mentioned above. Similar problems are also observed in a transmission controller, a traction controller, and an anti-skid control device (or the corresponding methods) whose control characteristics vary with a variation in driving range of the vehicle or road surface conditions.

SUMMARY OF THE INVENTION

One object of the invention is accordingly to realize high-speed and stable controls irrespective of characteristic perturbations accompanied with a variation in operation point of a plant.

Another object of the invention is to provide a vehicle control device for outputting a plant input to a plant or an object to be controlled so as to realize a high-speed and stable control of the plant to a target value.

Still another object of the invention is to provide a slip control device and an idling speed control device to which the principle of the vehicle control device is applied.

Another object of the invention is to provide corresponding methods of vehicle control, slip control, and idling speed control.

The invention is directed to a plant control device which cancels and compensates for characteristic perturbations of a plant. The plant control device of the invention calculates a plant input to be given to an object to be controlled or plant. The plant control device includes:

deviation detecting means for detecting a deviation of the controlled variable of the plant from the target value;

plant input calculating means for calculating a plant input corresponding to specified operation characteristics of the plant, based on at least the deviation detected by the deviation detecting means;

characteristic perturbation detecting means for detecting a perturbation of the plant from the specified operation characteristics;

compensating means for receiving the plant input calculated by the plant input calculating means, compensating the plant input to cancel the perturbation of operation characteristics detected by the characteristic perturbation detecting means; and outputting means for outputting the compensated plant input to the plant, so as to regulate a controlled variable of the plant to a target value.

In the plant control device, the deviation detecting means detects a deviation of an actual quantity of a plant from a target value. The plant input calculating means calculates a plant input corresponding to specified operation characteristics of the plant based on at least the deviation. The plant is not always under the specified operation characteristics, but the operation characteristics continuously vary from the specified level. The characteristic perturbation detecting means thus detects a perturbation of operation characteristics. The compensating means receives the plant input calculated by the plant input calculating means, compensates the plant input to cancel the perturbation of operation characteristics, and outputs the compensated plant input to the plant.

The principle of the invention is also applied to a plant in a vehicle, in more specific to a slip control device for controlling a slip of a clutch or an idling speed control device for an internal combustion engine. In such devices, the compensating means works to cancel characteristic perturbations accompanied with a variation in operation point.

The slip control device according to the invention calculates a plant input of an actuator constituting a control system for controlling a slip of a clutch mounted on a vehicle. The slip control device includes:

characteristic perturbation detecting means for detecting a perturbation of the control system for controlling the clutch slip from specified operation characteristics;

slip deviation detecting means for detecting a deviation of an actual slip of the clutch from the target slip;

plant input calculating means for calculating a plant input corresponding to the specified operation characteristics of the control system, based on at least the deviation detected by the slip deviation detecting means;

compensating means for receiving the plant input calculated by the plant input calculating means, compensating the plant input to cancel the perturbation of operation characteristics detected by the characteristic perturbation detecting means; and outputting means for outputting the compensated plant input to the actuator, so as to regulate a slip of the clutch to a target slip.

The slip control device of the invention controls a plant input given to the actuator constituting a control system for controlling a slip of a clutch. The characteristic perturbation detecting means detects a perturbation of the control system from specified operation characteristics, whereas the slip deviation detecting means detects a deviation of an actual slip of the clutch from the target slip. The plant input calculating means calculates a plant input corresponding to the specified operation characteristics of the control system based on at least the deviation. When the operation characteristics of the control system varies, the compensating means receives the plant input calculated by the plant input calculating means, compensates the plant input to cancel the perturbation of operation characteristics, and outputs the compensated plant input to the actuator.

The idling speed control device in accordance with the invention calculates a plant input of an actuator constituting a control system for controlling an idling speed of an internal combustion engine. The idling speed control device includes:

characteristic perturbation detecting means for detecting a perturbation of the control system for controlling the idling engine speed from specified operation characteristics;

engine speed deviation detecting means for detecting a deviation of an actual idling engine speed from the target engine speed;

plant input calculating means for calculating a plant input corresponding to the specified operation characteristics of the control system, based on at least the deviation detected by the engine speed deviation detecting means;

compensating means for receiving the plant input calculated by the plant input calculating means, compensating the plant input to cancel the perturbation of operation characteristics detected by the characteristic perturbation detecting means; and outputting means for outputting the compensated plant input to the actuator, so as to regulate the idling engine speed to a target engine speed.

The idling speed control device of the invention drives the actuator constituting a control system for controlling an idling speed of an internal combustion engine and regulates an actual idling engine speed to a target engine speed. The characteristic perturbation detecting means detects a perturbation of the control system from specified operation characteristics, whereas the engine speed deviation detecting means detects a deviation of an actual idling engine speed from the target engine speed. The plant input calculating means calculates a plant input corresponding to the specified operation characteristics of the control system based on at least the deviation. When the operation characteristics of the control system varies, the compensating means receives the plant input calculated by the plant input calculating means, compensates the plant input to cancel the perturbation of operation characteristics, and outputs the compensated plant input to the actuator.

The invention also provides a method of calculating a plant input to be given to a plant. This principle is also applied to a method of controlling a plant in a vehicle, in more specific, controlling a clutch slip as well as an idling engine speed.

These and other objects, features, aspects, and advantages of the present invention will become more apparent from the following detailed description of the preferred embodiment with the accompanying drawings.

BRIEF DESCRIPTION OF THE DRAWINGS

FIG. 3 schematically shows a vehicle power transmission system which a slip control device for a lock-up clutch embodying the invention is applied to;

FIGS. 9A through 9C show maps used for determining parameters α1, α2, α3, β1, β2, and β3;

FIGS. 28A and 28B show maps used for determining constants α and β in the second embodiment;

FIGS. 38A through 38C show maps used for determining the parameters α1, α2, α3, β1, β2, and β3;

DESCRIPTION OF THE PREFERRED EMBODIMENT

Figure 39A:
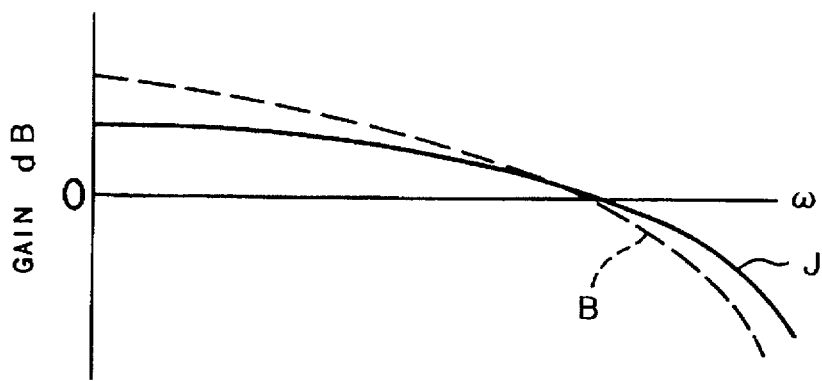
FIGS. 39A and 39B are graphs showing gain-frequency characteristics and phase-frequency characteristics of a transfer function from a plant input to a controlled variable of a plant.
Figure 39B:
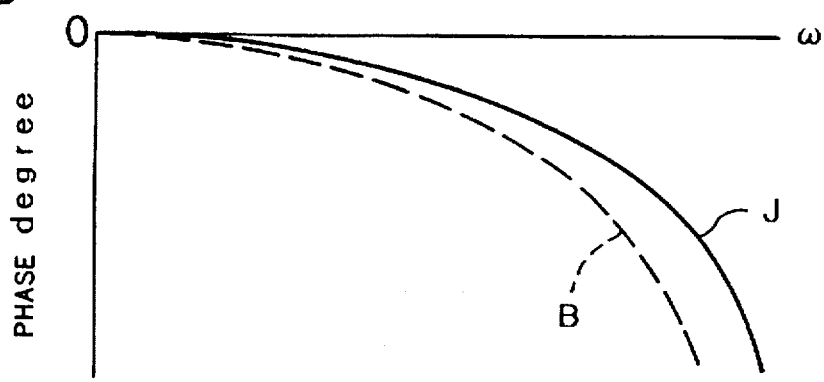
Figure 40A:
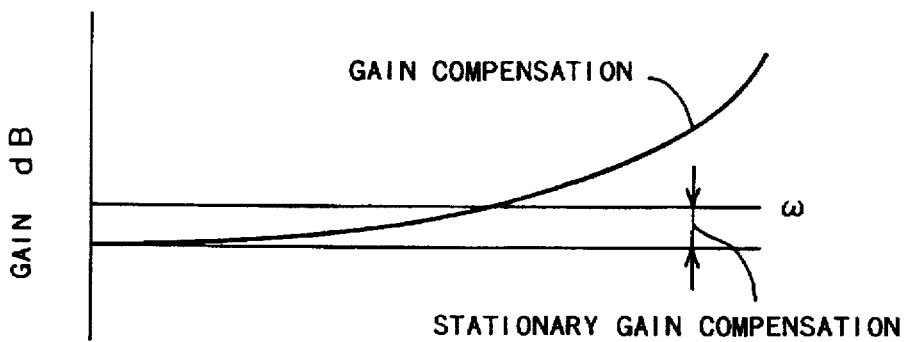
FIGS. 40A and 40B are graphs showing frequency (ω)-dependent phase and gain compensations and a stationary gain compensation independent of the frequency ω.
Figure 40B:
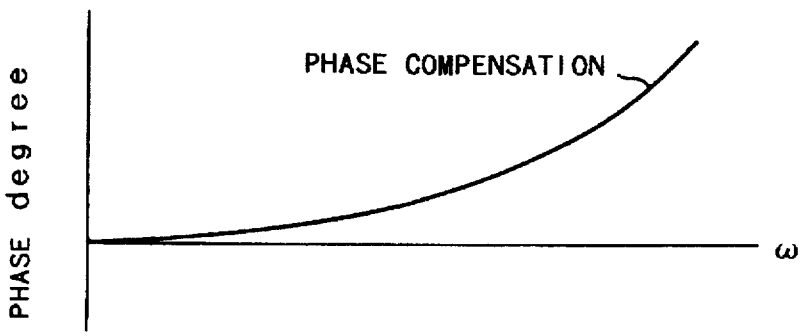

Prior to description of the respective embodiments in accordance with the invention, the principle of operation common to these embodiments are described according to the drawings. FIGS. 39A and 39B show characteristic perturbations of an object to be controlled or a plant, for example, a system for controlling slip conditions of a lock-up clutch of a torque converter. More specifically, graphs of FIGS. 39A and 39B respectively show gain-frequency and phase-frequency characteristics of a transfer function from a plant input (target slip) to a controlled variable of the plant (actual slip). In the graphs, solid lines J represent characteristics expected at a designpoint and broken lines B show characteristics at a deviated operation point. Characteristic perturbations of the plant vary between the respective operation domains, but can be classified into frequency (ω)-dependent phase and gain perturbations and stationary gain perturbations. Frequency (ω)-dependent phase and gain compensations and a stationary gain compensation independent of the frequency ω are required as illustrated in FIGS. 40A and 40B in order to regain the original characteristics.

Figure 41:
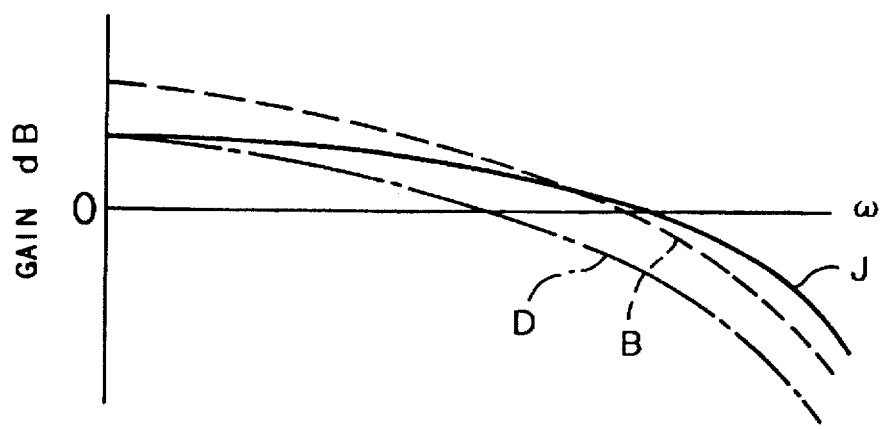
FIG. 41 is a graph showing a stationary gain compensation for characteristic perturbations at an actual operation point deviated from the design point.
Figure 42A:
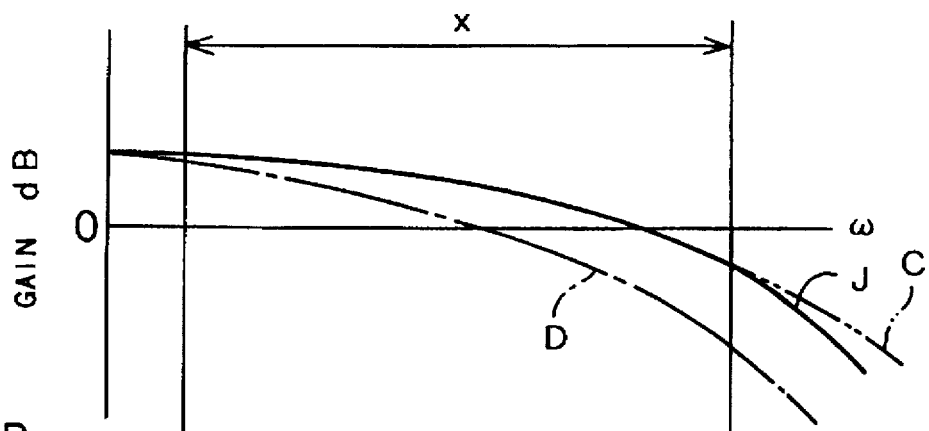
FIGS. 42A and 42B are graphs showing frequency ω-dependent phase and gain compensations by a frequency filter in combination with the stationary gain compensation.
Figure 42B:
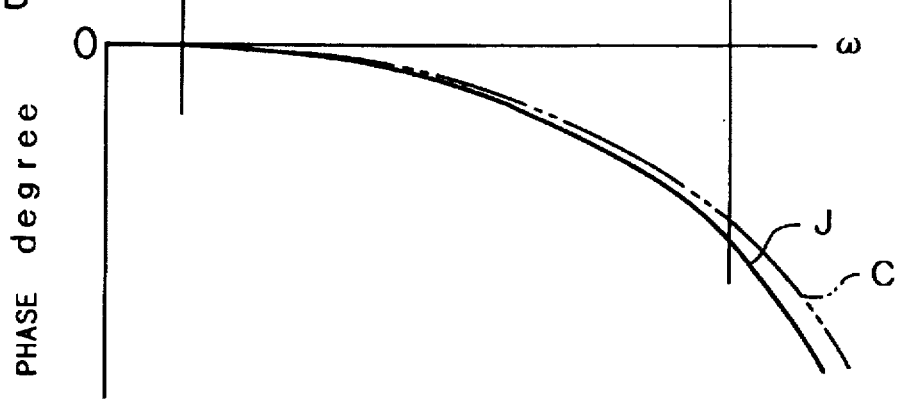
Figure 43:
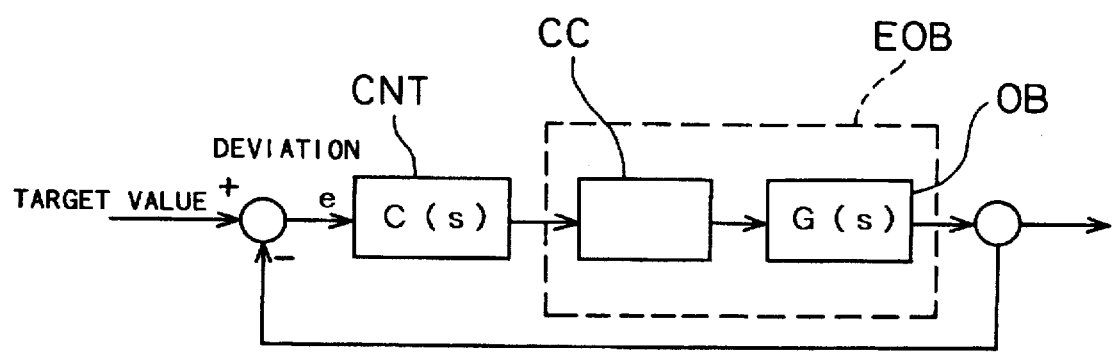
FIG. 43 shows an augmented plant EOB.

A curve of one-dot chain line D in the graph of FIG. 41 represents gain characteristics obtained through a stationary gain compensation for characteristic perturbations at an actual operation point deviated from the design point. Curves of the two-dot chain line C in the graphs of FIGS. 42A and 42B show gain and phase characteristics after frequency ω-dependent phase and gain compensations by a frequency filter in combination with the stationary gain compensation. These compensations allow the characteristics B at the deviated operation point to approximate to the characteristics J expected at the design point. As illustrated in FIG. 43, a characteristic compensator CC is disposed before a plant OB, which is activated at an actual operation point deviated from the design point. A controller CNT recognizes an augmented plant EOB, including the characteristic compensator CC and the plant OB, as characteristics expected at the design point. The controller CNT itself accordingly does not change constants or take any countermeasures against perturbations of control characteristics.

Perturbations in gain and phase characteristics described above are used only for illustrative purposes, and actual gain and phase characteristics of the plant to be controlled by a vehicle control device depend upon the plant. The phase and gain characteristics show different behaviors between respective operation domains. The characteristic compensator CC functioning as the compensating means of the invention is designed suitable for each plant, and not restricted by illustrations of FIGS. 39 through 43 in any sense. Compensation for characteristic perturbations is not always required for all frequency domains, but sufficient compensation is critical only for some important frequency domains in control operations (for example, domain 'x' illustrated in FIGS. 42A and 42B). Although compensation is insufficient in a high frequency domain in this example, sufficient stability is ensured by robust control of the controller CNT. Concrete structures of the compensating means will be described later.

Figure 3:
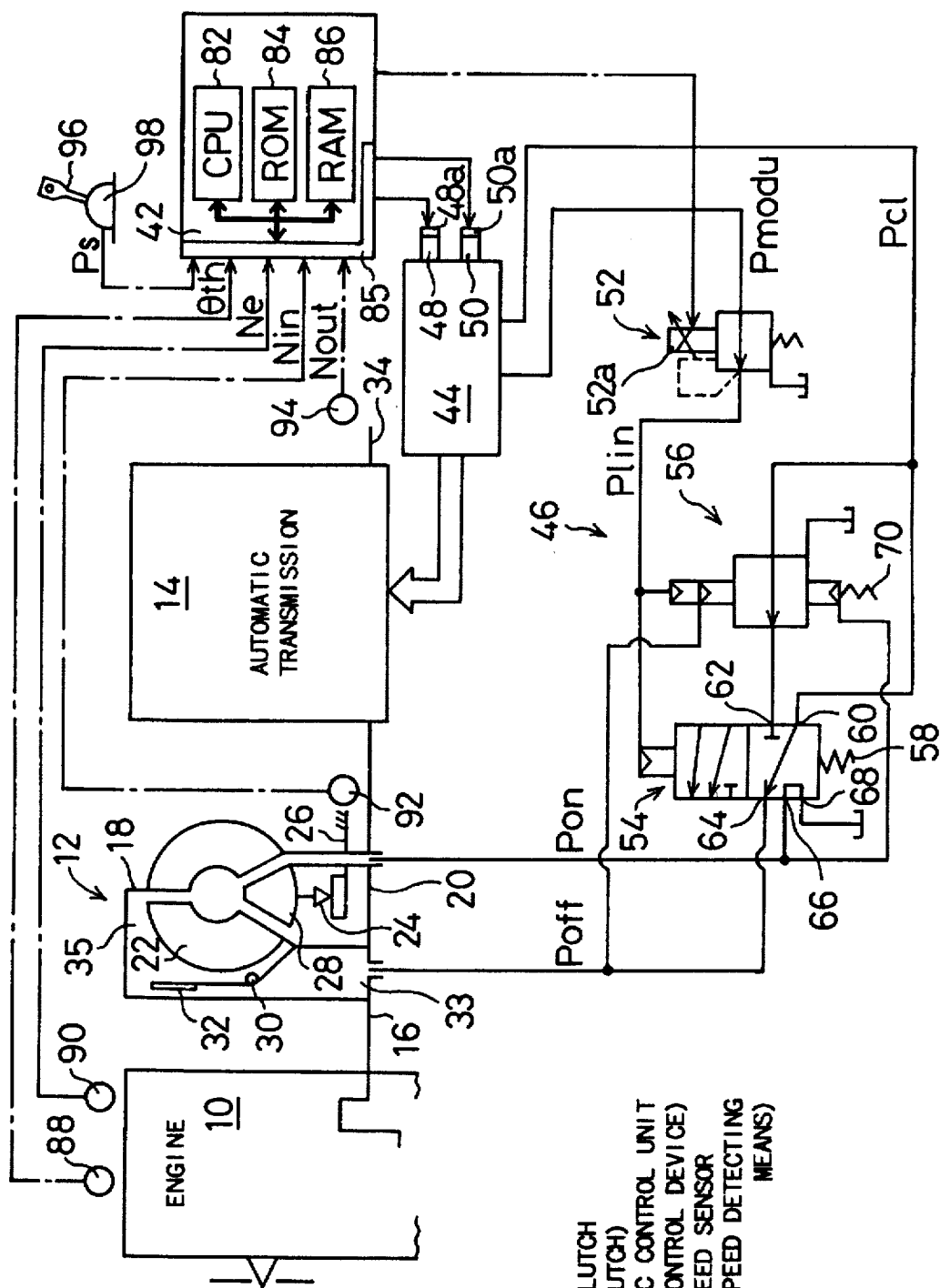

The principle of the invention is applied to a slip control device described herein as a first embodiment. In the block diagram of FIG. 3, power of an engine 10 is transmitted to driving wheels via a stepped automatic transmission 14, including a torque converter 12 with a lock-up clutch and three sets of planetary gear units, and a differential gear unit (not shown).

The torque converter 12 is fixed to a pump impeller 18 coupled with a crank shaft 16 of the engine 10 and with an input shaft 20 of the automatic transmission 14. The torque converter 12 is provided with a turbine runner 22 rotating with oil supplied from the pump impeller 18, a stator 28 fixed to a non-rotating housing element 26 via a one-way clutch 24, and a lock-up clutch 32 coupled with the input shaft 20 via a damper 30. The lock-up clutch 32 directly connects the input and output elements of the torque converter 12, that is, the crank shaft 16 and the input shaft 20, with each other. While the oil pressure in an engagement oil chamber 35 of the torque converter 12 is higher than the oil pressure in a release oil chamber 33, the lock-up clutch 32 is held in an engagement condition to transmit rotations of the crank shaft 16 directly to the input shaft 20. Upon condition that the oil pressure in the release oil chamber 33 of the torque converter 12 is higher than the oil pressure in the engagement oil chamber 35, on the contrary, the lock-up clutch 32 is held in a non-engagement condition to allow the torque converter 12 to implement its primary functions. Under the non-engagement condition, the torque converter 12 converts a torque at an amplification rate corresponding to an input/output rotating speed ratio and then transmits the converted torque of the crank shaft 16 to the input shaft 20.

The automatic transmission 14 having the input shaft 20 and an output shaft 34 is constructed as a stepped planetary gear unit wherein one of a plurality of forward gear steps and a reverse gear step is selected to be under an engagement condition according to a specific combination of operating conditions of a plurality of hydraulic frictional engagement units. The automatic transmission 14 includes a hydraulic change gear control circuit 44 for regulating gear steps of the automatic transmission 14 and a hydraulic engagement control circuit 46 for controlling engagement of the lock-up clutch 32. The hydraulic change gear control circuit 44 has a first solenoid-operated valve 48 and a second solenoid-operated valve 50, which are respectively operated on and off by a solenoid 48a and a solenoid 50a. The clutch and brake mechanism is selectively operated according to a combination of the operating conditions of the first solenoid-operated valve 48 and the second solenoid-operated valve 50 so as to realize one of a first gear speed through a fourth gear speed.

The hydraulic engagement control circuit 46 includes a linear solenoid valve 52, a change-over valve 54, and a slip control valve 56. The linear solenoid valve 52 has a fixed modulator pressure Pmodu generated in the hydraulic change gear control circuit 44 as an initial pressure and acts linearly in response to the current running through a linear solenoid 52a. The linear solenoid valve 52 continuously generates an output pressure Plin having the magnitude corresponding to the intensity of a driving current Isol from an electronic control unit (ECU) 42. The output pressure Plin is applied to the change-over valve 54 and the slip control valve 56. The change-over valve 54 is movable between a release position at which the lock-up clutch 32 is released and an engagement position at which the lock-up clutch 32 is engaged. Initial operating pressure of the slip control valve 56 is a regulator pressure Pcl generated in response to a throttle valve travel by a clutch pressure control valve (not shown) in the hydraulic change gear control circuit 44.

The change-over valve 54 includes a spring 58 for pressing a spool valve element (not shown) towards the release position, a first port 60 receiving the regulator pressure Pcl, a second port 62 receiving an output pressure of the slip control valve 56, a third port 64 connecting with the release oil chamber 33, a fourth port 66 connecting with the engagement oil chamber 35, and a fifth port 68 connecting with a drain pipe. When the output pressure Plin of the linear solenoid valve 52 applied onto the spool valve element of the change-over valve 54 becomes lower than a predetermined level, the spool valve element of the change-over valve 54 is moved to the release position illustrated in FIG. 3 by the pressing force of the spring 58. The shift of the change-over valve 54 to the release position results in blocking the second port 62 and connecting the first port 60 to the third port 64 as well as the fourth port 66 to the fifth port 68. This makes an oil pressure Poff in the release oil chamber 33 equal to the regulator pressure Pcl and an oil pressure Pon in the engagement oil chamber 35 equal to the atmospheric pressure, thereby releasing the lock-up clutch 32. At this moment, the torque converter 12 implements its primary functions to convert and transmit the torque.

When the output pressure Plin of the linear solenoid valve 52 applied on the spool valve element of the change-over valve 54 becomes higher than the predetermined level, on the other hand, the spool valve element of the change-over valve 54 is moved to the engagement position against the pressing force of the spring 58. The shift of the change-over valve 54 to the engagement position results in blocking the fifth port 68 and connecting the first port 60 to the fourth port 66 as well as the second port 62 to the third port 64. This makes the oil pressure Pon in the engagement oil chamber 35 equal to the regulator pressure Pcl and controls the oil pressure Poff in the release oil chamber 35 by means of the slip control valve 56, thereby slip controlling or engaging the lock-up clutch 32.

The slip control valve 56 is provided with a spring 70 for pressing a spool valve element (not shown) towards an increase in the output pressure. The oil pressure Pon in the engagement oil chamber 35 is applied onto the spool valve element of the slip control valve 56 to generate a driving force towards an increase in the output pressure whereas the oil pressure Poff in the release oil chamber 33 and the output pressure Plin of the linear solenoid valve 52 are applied onto the spool valve element of the slip control valve 56 to generate a driving force towards a decrease in the output pressure. The slip control valve 56 accordingly works to vary a pressure difference ΔP=Pon-Poff representing a slip amount, in response to the output pressure Plin of the linear solenoid valve 52 as expressed by:

$$\Delta P = Pon - Poff \quad (1)$$
$$= (A3 - A1)Plin - F/A1$$

where F, A1, A2(=A1), and A3 respectively denote a pressing force of the spring 70, an area in the spool valve element which the oil pressure Pon is applied to, an area which the oil pressure Poff is applied to, an area which the output pressure Plin is applied to.

Figure 4:
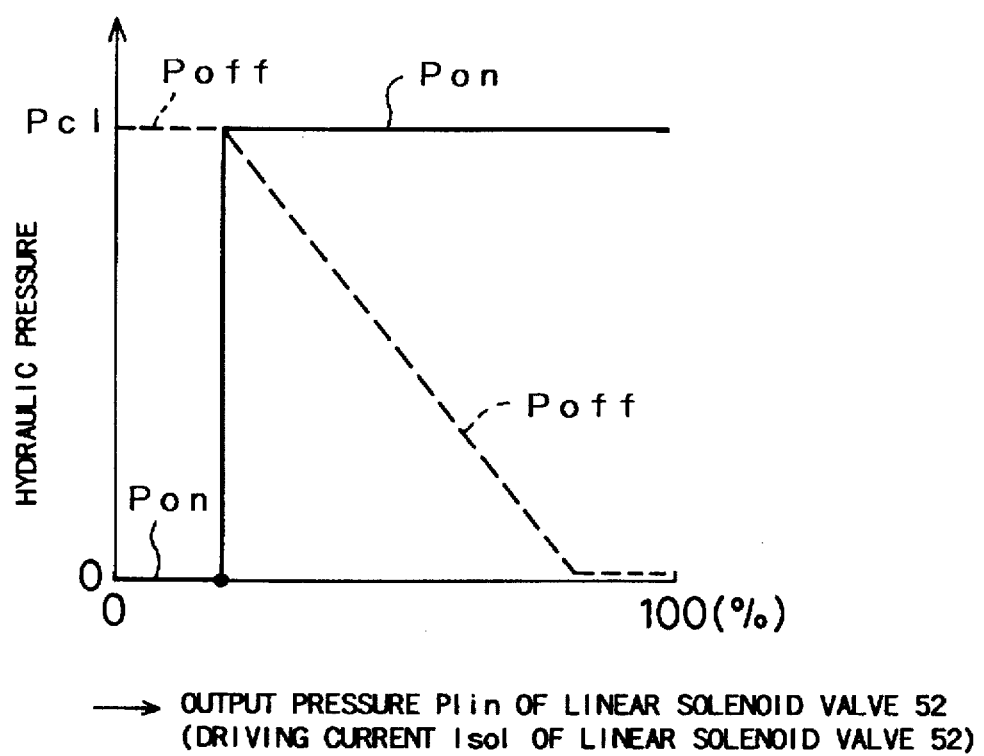
FIG. 4 is a graph showing the relationship between the driving current running through a linear solenoid valve 52 and the oil pressure Pcl.

In the hydraulic engagement control circuit 46 constructed as above, both the oil pressure Pon in the engagement oil chamber 35 and the oil pressure Poff in the release oil chamber 33 vary with the output pressure Plin of the linear solenoid valve 52 as shown in the graph of FIG. 4. This means that the switching operation of the change-over valve 54 and the slip control of the lock-up clutch 32 after a shift of the change-over valve 54 to the engagement position are conducted in response to the output pressure Plin of the linear solenoid valve 52.

The electronic control unit 42 designed and constructed as below executes the processing required for the slip control. The electronic control unit 42 is constructed as a microcomputer consisting of a variety of known elements including a CPU 82, a ROM 84, a RAM 86, and an interface circuit (not shown). In this embodiment, the interface circuit 85 of the electronic control unit 42 connects with a throttle sensor 88 for detecting a travel of a throttle valve disposed in an intake manifold of the engine 10, an engine speed sensor 90 for detecting the rotating speed of the engine 10, an input shaft speed sensor 92 for detecting the rotating speed of the input shaft 20 of the automatic transmission 14, an output shaft speed sensor 94 for detecting the rotating speed of the output shaft 34 of the automatic transmission 14, and a lever position sensor 98 for detecting the position of a gear shift lever 96, L (low), S (second), D (drive), N (neutral), R (reverse), and P (parking) ranges. The electronic control unit 42 receives data of a throttle valve travel θth, an engine speed Ne (rotating speed NP of the pump impeller 18), a rotating speed Nin of the input shaft 20, a rotating speed Nout of the output shaft 34, and a position Ps of the gear shift lever 96 output from the corresponding sensors 88, 90, 92, 94, and 98 via the interface circuit 85.

The CPU 82 of the electronic control unit 42 uses the RAM 86 as a work area, processes input signals according to a program previously stored in the ROM 84, and controls the first solenoid-operated valve 48, the second solenoid-operated valve 50, and the linear solenoid valve 52 to execute the change gear control of the automatic transmission 14 and the engagement and release of the lock-up clutch 32. Concrete process of the change gear control includes steps of selecting a change gear map corresponding to an actual change gear step out of a plurality of change gear maps previously stored in the ROM 84, referring to the selected change gear map to determine a change gear step based on a driving condition of the vehicle, for example, a vehicle speed SPD calculated from the throttle valve travel θth and the output shaft rotating speed Nout, and actuating the first solenoid-operated valve 48 and the second solenoid-operated valve 50 to realize the change gear step. The CPU 82 accordingly controls the clutch and braking mechanism of the automatic transmission 14 and selects one of the four forward gear steps to realize a desirable gear change.

Figure 1:
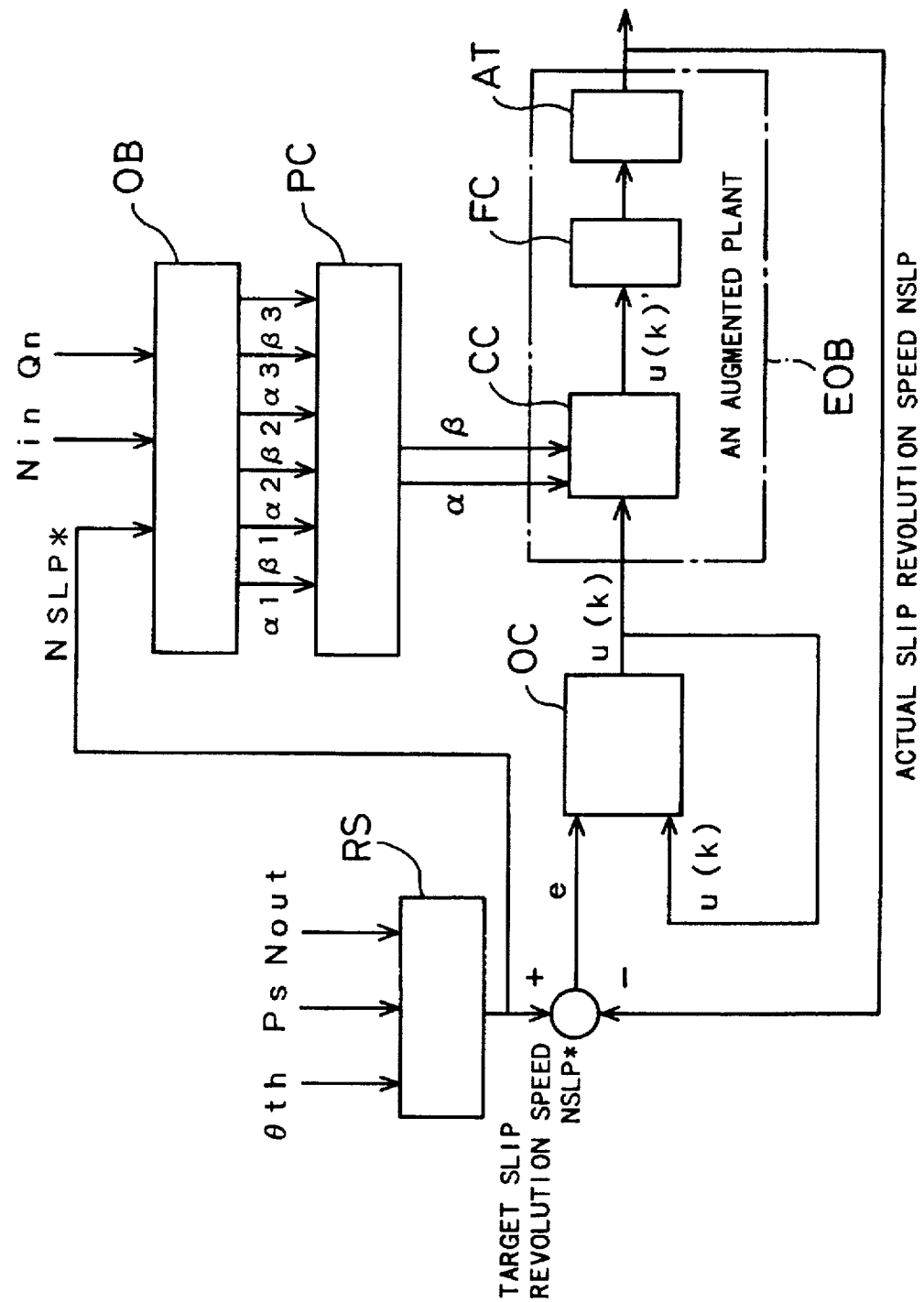
FIG. 1 is a block diagram showing a functional structure of a clutch slip control device as a first embodiment in accordance with the invention.

The electronic control unit 42 also executes a slip control routine for a lock-up clutch. FIG. 1 is a block diagram illustrating functional structure of a slip control system for a clutch. The slip control system determines a plant input u(k), that is, a quantity of duty-on and -off for controlling the solenoid of the lock-up clutch 32, based on a deviation e(k) of an actual slip revolution speed NSLP from a target slip revolution speed NSLP* obtained from the throttle valve travel θth, the change gear step Ps, and the output shaft rotating speed Nout. The plant input u(k) is determined by H∞ (H infinity) control (described later) to ensure optimal slip control at the design point. The actual slip control system does not always work at the design point, but has the operation point varied with driving conditions of the vehicle. A characteristic compensation process is thus executed to determine a modified plant input u(k) for the control system at the deviated operation point and output the modified plant input u(k) to the solenoid. As the duty of the solenoids varies, the slip conditions of the lock-up clutch 32 in the torque converter 12 changes via the hydraulic control system, so that the actual slip revolution speed NSLP is adjusted towards the target slip revolution speed NSLP*. Constants α and β used as correction factors for the characteristic compensation process are calculated from parameters α1, α2, α3, β1, β2, and β3, which represent conditions of slip control and are obtained from the input shaft rotating speed Nin, the target slip revolution speed NSLP*, and an amount of air intake Qn.

With reference to FIG. 1, the process of determining the target slip revolution speed NSLP* based on the throttle valve travel θth, the change gear step Ps, and the output shaft rotating speed Nout is realized by a target value setting unit RS which makes up part of a deviation detection means schematically illustrated as 800; the process of calculating the plant input u(k) with respect to the linear solenoid valve 52 of the lock-up clutch 32 by a plant input calculation unit OC which makes up part of a plant input means schematically illustrated as 803; the characteristic compensation by the characteristic compensator CC which makes up part of a compensation means schematically illustrated as 807; the process of obtaining parameters α1, α2, α3, β1, β2, and β3 representing conditions of slip control, from the input shaft rotating speed Nin, the target slip revolution speed NSLP*, and the amount of air intake Qn by an operating condition evaluation unit OB; and the process of calculating the constants α and β used for the characteristic compensation process by a constants operation unit PC. Although the actual processing is executed by an arithmetic-logic operations unit of the CPU 82 in the electronic control unit 42, the whole processes realized by the control system are easily understood by the block diagram of FIG. 1. The control system shown in FIG. 1 also includes a hydraulic control system FC driven by the valve travel of the linear solenoid valve 52, and a unit AT for determining slip conditions of the lock-up clutch 32 in the torque converter 12.

Figure 5:
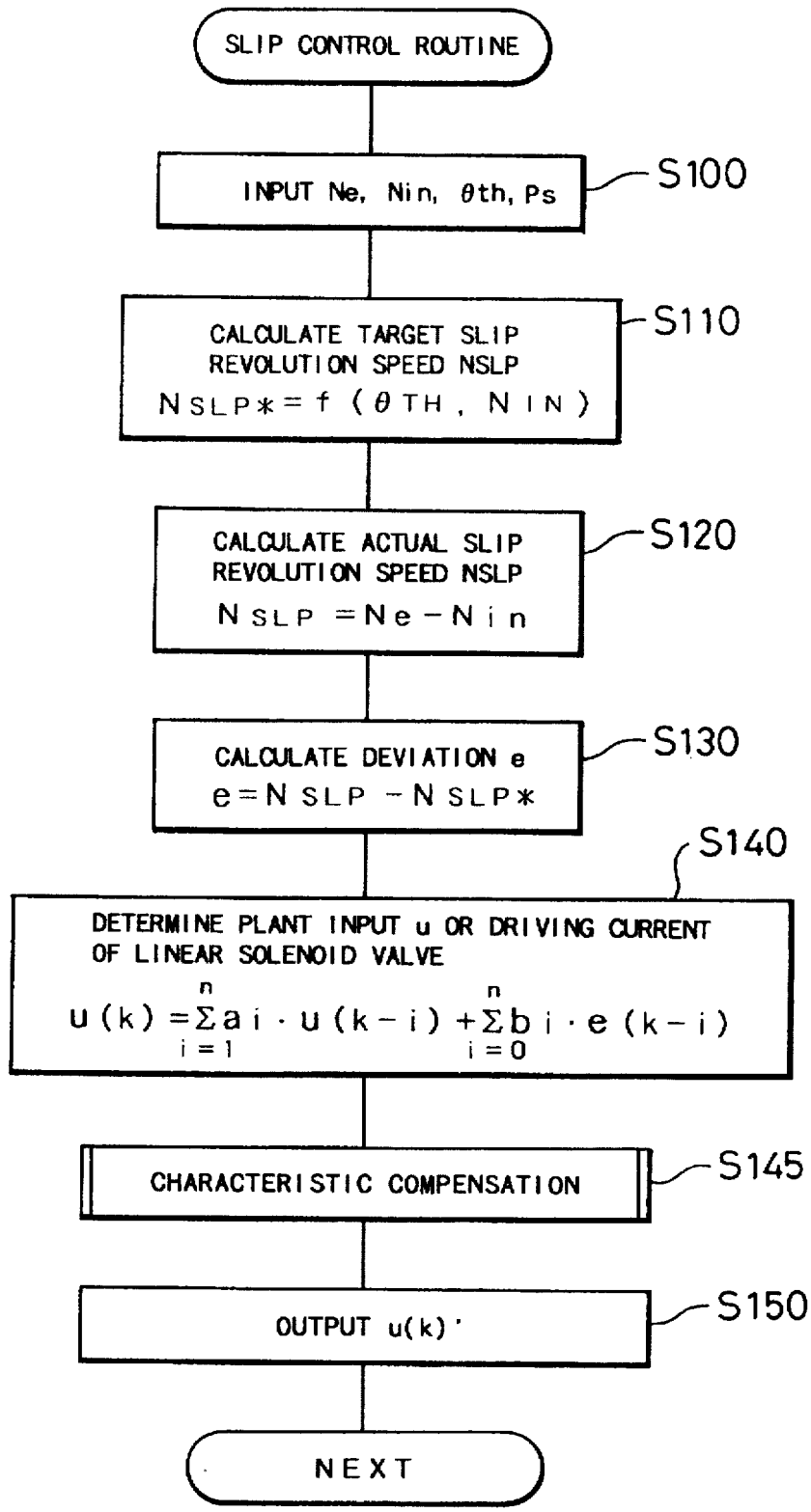
FIG. 5 is a flowchart showing a slip control routine executed in the first embodiment.
Figure 6:
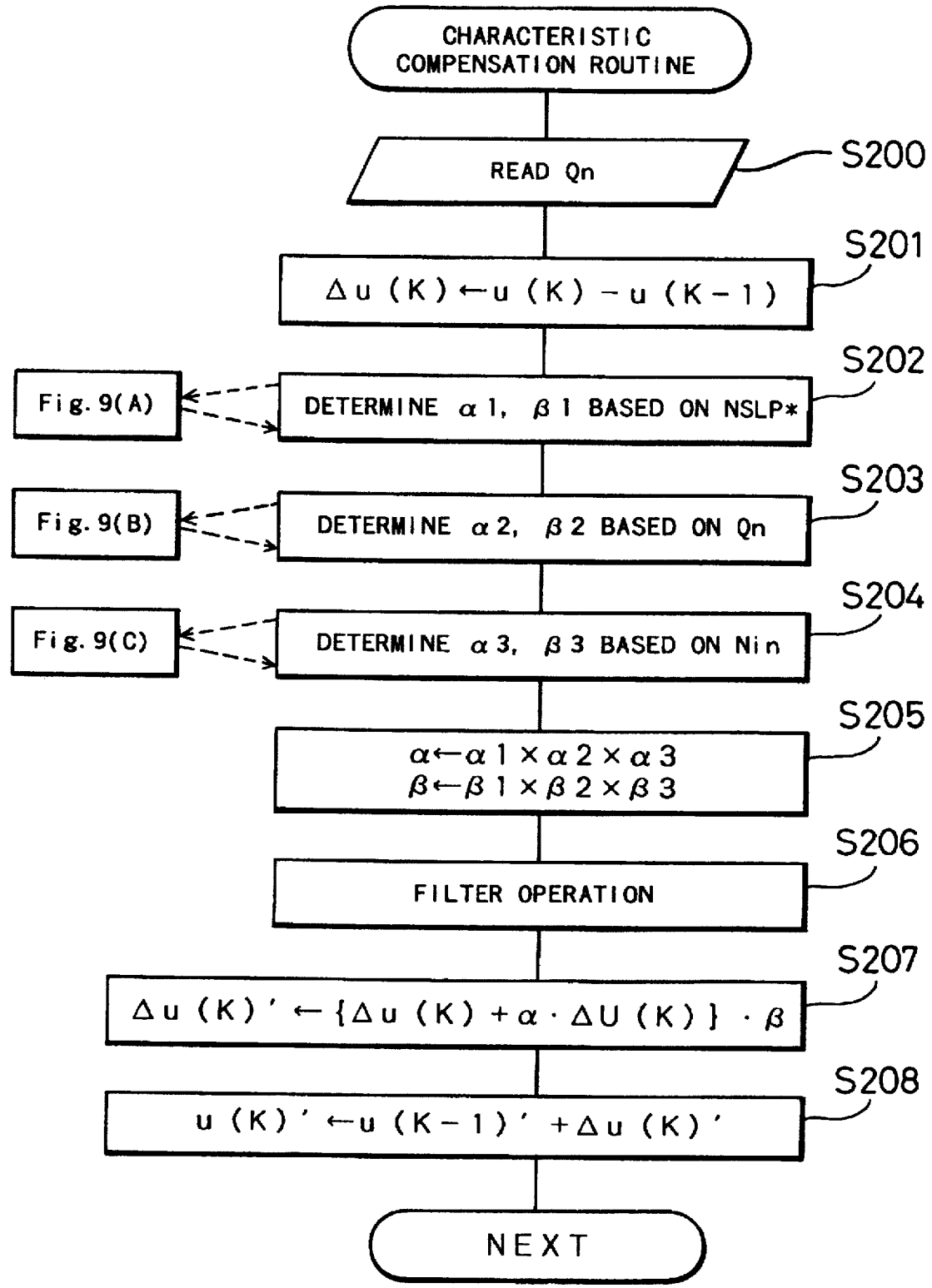
FIG. 6 is a flowchart showing a characteristic compensation routine executed in the first embodiment.
Figure 7:
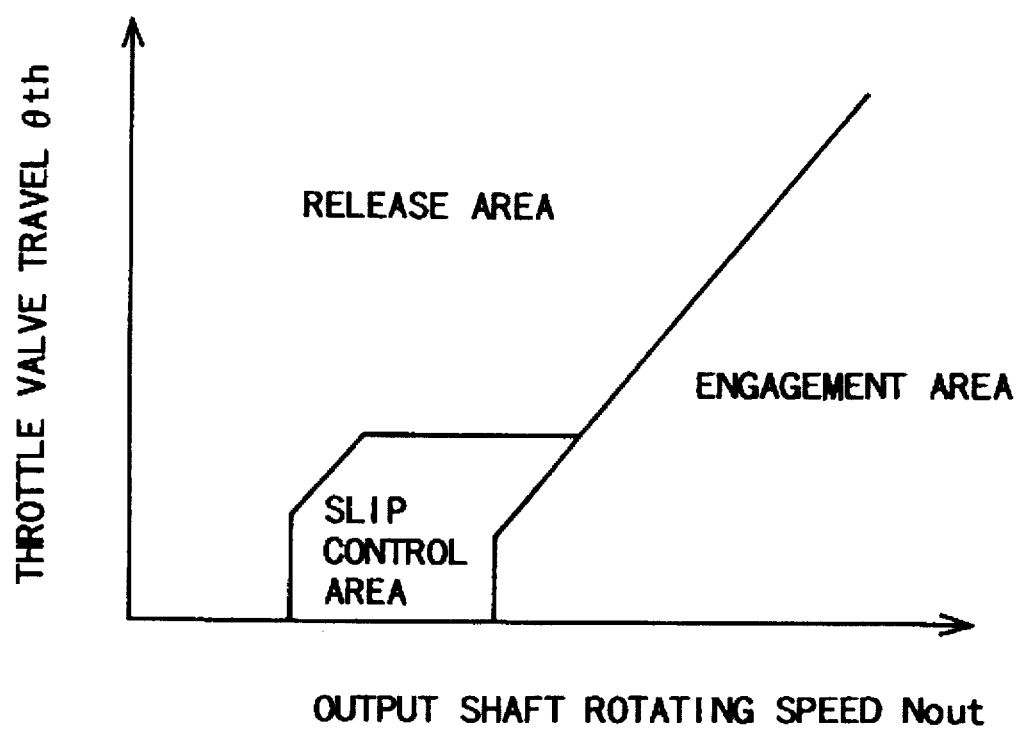
FIG. 7 is a graph showing a target domain of slip control defined by the output shaft rotating speed Nout and the throttle valve travel θth in the first embodiment.

The electronic control unit 42 executes the processes shown in the flowcharts of FIGS. 5 and 6. The flowchart of FIG. 5 shows a slip control routine executed by the electronic control unit 42, and that of FIG. 6 shows a characteristic compensation routine executed at step S145 in the flowchart of FIG. 5. The electronic control unit 42 specifies a target domain of the slip control operation based on the driving conditions of the vehicle and repeatedly execute the slip control routine at intervals of several milliseconds or several tens milliseconds. In a concrete operation, the electronic control unit 42 determines whether the slip control routine is to be executed, based on the output shaft rotating speed Nout and the throttle valve travel θth. FIG. 7 illustrates a target domain of slip control.

Upon condition that beth the output shaft rotating speed Nout and the throttle valve travel θth are in the target domain of slip control shown in FIG. 7, the electronic control unit 42 starts the slip control routine of FIG. 5. At step S100, data of the engine speed Ne, the input shaft rotating speed Nin, the output shaft rotating speed Nout, the throttle valve travel θth, and the change gear step Ps are input via the interface circuit. At step S110, the electronic control unit 42 calculates a target slip revolution speed NSLP* from the output shaft rotating speed Nout, the throttle valve travel θth, and the change gear step Ps input at step S100. The target slip revolution speed NSLP* may be determined by referring to a three-dimensional map prepared and stored for each change gear step Ps to represent the relationship between the output shaft rotating speed Nout, the throttle valve travel θth, and the target slip revolution speed NSLP*.

Figure 8:
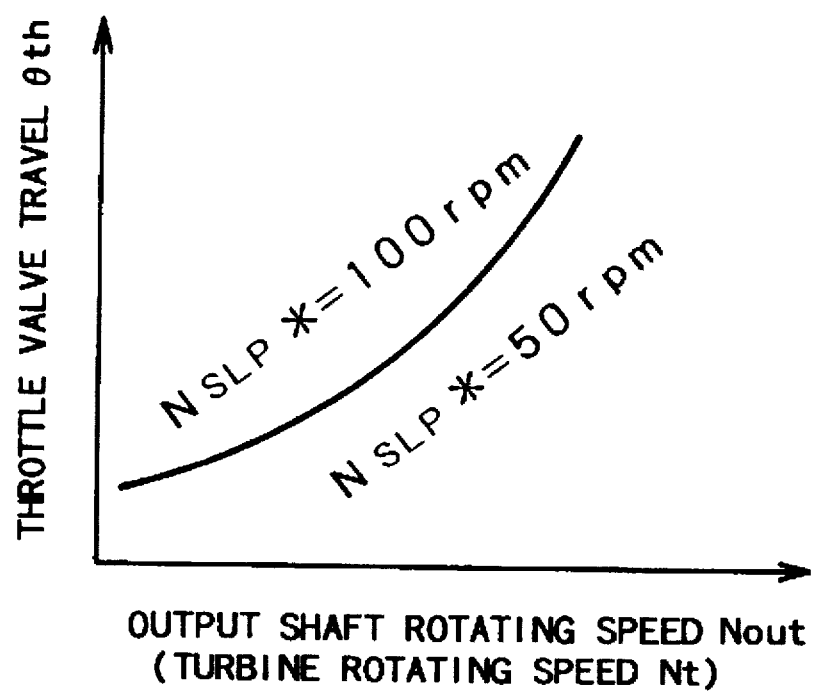
FIG. 8 is a graph for determining a target slip revolution speed NSLP* in the target domain.

FIG. 8 is an exemplified map applicable to determination of the target slip revolution speed NSLP* based on the output shaft rotating speed Nout and the throttle valve travel θth at a specified change gear position Ps. In this example, the target slip revolution speed NSLP* is determined to be either 50 rpm or 100 rpm according to the output shaft rotating speed Nout and the throttle valve travel θth. The process of determining the target slip revolution speed NSLP* corresponds to the target value setting unit RS shown in FIG. 1. After the target slip revolution speed NSLP* is determined at step S110, the program proceeds to step S120 at which an actual slip revolution speed NSLP of the torque converter 12 is calculated as a difference between the engine speed Ne and the input shaft rotating speed Nin. At step S130, a deviation e is determined by subtracting the target slip revolution speed NSLP* from the actual slip revolution speed NSLP.

Although the number of times of repeating the slip control routine is not mentioned above, the routine repeated at intervals of several milliseconds or several tens milliseconds is a discrete process to make the times of repetition distinguishable. The electronic control unit 42 stores in the RAM 86 data of the deviation e and a plant input u corresponding to a driving current actually running through the linear solenoid valve 52, which are obtained in the current cycle through in the cycle executed i times before. At step S140, the electronic control unit 42 calculates the plant input u corresponding to the driving current of the linear solenoid valve 52 by the equation given below:

$$u(k) = \sum_{i=1}^{n} ai \cdot u(k-i) + \sum_{i=0}^{n} bi \cdot e(k-i) \tag{2}$$

As expressed by Equation 2, a next plant input u(k) is determined as a total of summation of past plant inputs u(k-i) multiplied by a first controller coefficient ai and summation of past deviations e(k-i) multiplied by a second controller coefficient bi. The past plant inputs u(k-i) and the past deviations e(k-i) are obtained in the previous cycle through in the cycle executed n times before, and in the current cycle through in the cycle executed n times before, respectively. Although H∞ control is applied to calculate the plant input u(k) in accordance with Equation 2 in this embodiment, H∞ control is not essential to the principle of the invention and the conventional PID control may also be applicable. Details of the H∞ control including the determination of the coefficients ai and bi will be described later. The process of determining the plant input u(k) corresponds to the plant input calculation unit OC shown in FIG. 1.

The program subsequently goes to step S145 at which characteristic compensation is executed with respect to the plant input u(k) determined at step S140 to give a modified plant input u(k)'. The program proceeds to step S150 to output the modified plant input u(k)' to the linear solenoid valve 52 via the interface circuit and goes to NEXT to exit from the routine.

FIG. 6 shows details of the characteristic compensation process executed at step S145 in the flowchart of FIG. 5. The characteristic compensation process corresponds to the characteristic compensator CC shown in FIG. 1. The electronic control unit 42 reads the amount of air intake Qn at step S200, and determines a difference of plant input Δu(k) at step S201 by subtracting a previous plant input u(k−1) from a current plant input u(k−1) determined at step S140 in the flowchart of FIG. 5. The difference of plant input has the smaller absolute value than the plant input itself, thereby improving the precision of operation. This process corresponds to a differential operation unit DC shown in FIG. 2.

At steps S202, S203, and S204, parameters α1, β1, α2, β2, α3, and β3 are determined by referring to maps of the input shaft rotating speed Nin read at step S100 in the flowchart of FIG. 5, the target slip revolution speed NSLP* obtained at step S110 of FIG. 5, and the amount of air intake Qn read at step S200 in the flowchart of FIG. 6. FIG. 9A shows a map applied to determine the parameters α1 and β1 based on the target slip revolution speed NSLP*; FIG. 9B is a map for determining the parameters α2 and β2 according to the amount of air intake Qn; and FIG. 9C is a map for determining the parameters α3 and β3 according to the input shaft rotating speed Nin. This process corresponds to the operating condition evaluation unit OB shown in FIG. 1.

At step S205, constants α and β are obtained from these parameters α1, α2, α3, β1, β2, and β3. The constants α and β are inherently affected by a variety of physical properties (in this embodiment, the target slip revolution speed NSLP*, the amount of air intake Qn, and the input shaft rotating speed Nin). Although application of higher-dimensional maps improves precision of the operation, three-dimensional or higher-dimensional maps undesirably require a greater storage area. The structure of the embodiment accordingly determines the parameters α1, α2, α3, β1, β2, and β3 based on such physical properties and calculates the constants α and β by multiplying the corresponding parameters. This process ensures the precision substantially equivalent to that of determination of the constants α and β by higher-dimensional maps. The maps illustrated in FIGS. 9A through 9C require a relatively small storage capacity.

In this embodiment, the constants α and β are determined respectively by multiplying the parameters α1 through α3 and the parameters β1 through β3. An interpolation process or any other operation may be applicable as long as it gives equivalent results to those by the application of higher-dimensional maps. The constant α (and β) may be determined, for example, as a sum of the parameters α=α1+α2+α3, as a minimum of the parameters α=min(α1,α2,α3), or as a maximum of the parameters α=max(α1,α2,α3). The adequate operation and parameters should be selected to determine the constants α and β with high precision. A plurality of operations may be applied over specific ranges of physical properties.

Figure 2:
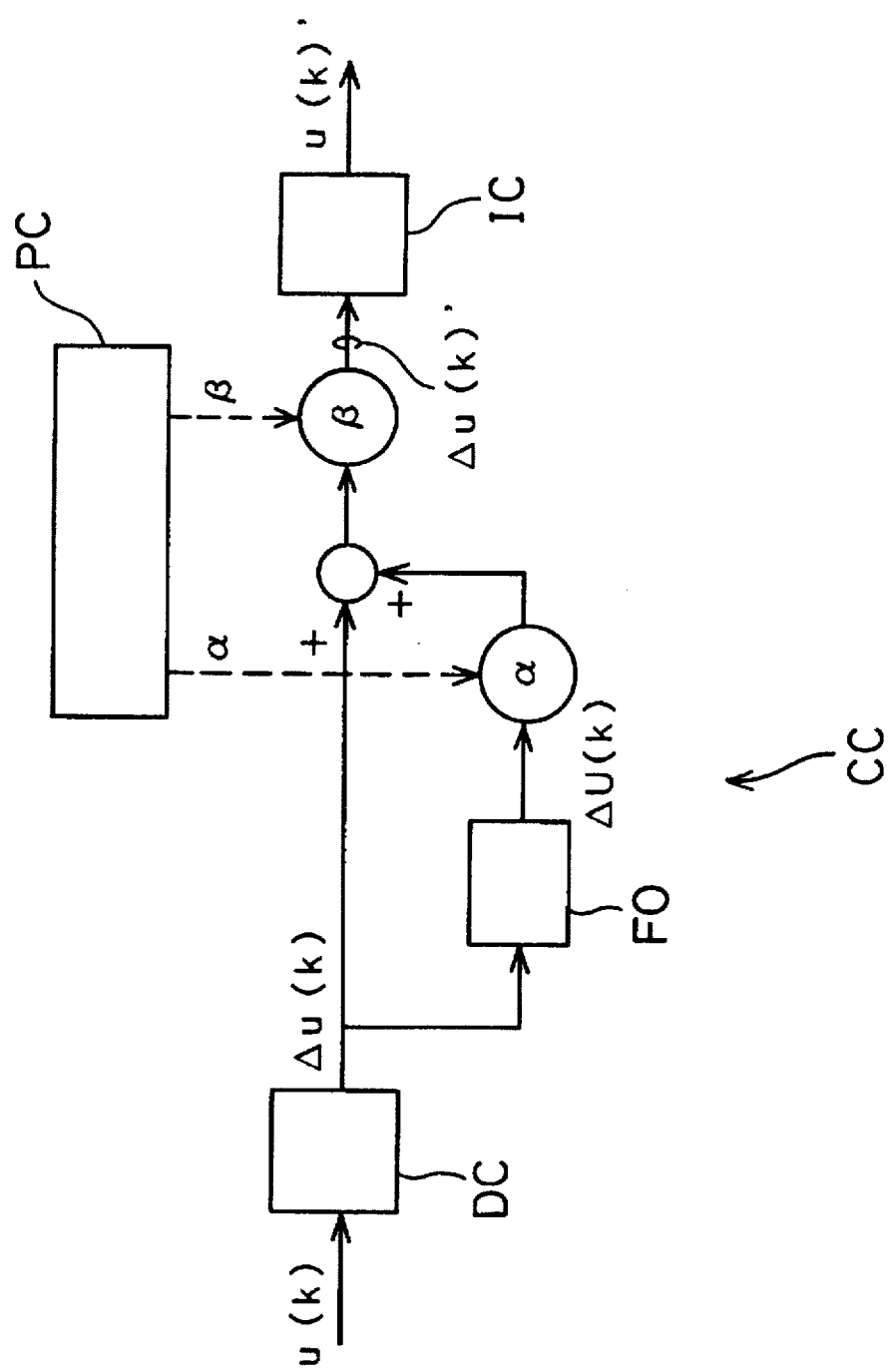
FIG. 2 is a block diagram illustrating an internal structure of a characteristic compensator CC in the clutch slip control device of FIG. 1.

The process of calculating the constants α and β from the parameters corresponds to the constants operation unit PC shown in FIGS. 1 and 2. The program then proceeds to step S206 at which a filter operation is executed with respect to the difference of plant input Δu(k). At step S207, the electronic control unit 42 calculates a modified difference of plant input Δu(k)' from an output Δu(k) obtained at step S206, the difference of plant input Δu(k), and the constants α and β according to Equation 3 given below. The process of filter operation corresponds to a filter operation unit FO shown in FIG. 2. Details of the filter operation will be described later.

$$\Delta u(k)' = \{\Delta u(k) + \alpha \cdot \Delta U(k)\} \cdot \beta \tag{3}$$

At step S208, a current modified plant input u(k)' is determined by adding a previous modified plant input u(k−1)' obtained in a previous cycle to the modified difference of plant input au(k)'. This process corresponds to an integral operation unit IC shown in FIG. 2. The modified plant input u(k)' thus obtained is output to the linear solenoid valve 52 at step S150 in the flowchart of FIG. 5.

These processes described above imply that the plant input calculation unit OC working as a controller recognizes the actual plant plus the characteristic compensator CC as an augmented plant EOB as shown in FIG. 1. The plant input calculation unit OC working as the controller to the augmented plant EOB determines a plant input on the assumption that the plant exists at a specific operation point or design point. The actual operation point of the plant receiving the plant input may, however, be deviated from the design point according to the driving conditions of the vehicle. The characteristic compensator CC compensates for characteristic perturbations due to such deviation. This means that the characteristic compensator CC compensates to allow the plant input calculation unit OC working as the controller to recognize the augmented plant EOB (actual plant+characteristic compensator CC) at the specific operation point or design point.

The characteristic compensator CC satisfies the following design principles. As illustrated in FIGS. 39 through 42, the characteristic perturbations or the perturbations of the transfer function correspond to the perturbations of gain and phase in a certain frequency domain. The phase deviation is enhanced at higher frequencies. Both the stationary gain independent of the frequency and the frequency-dependent gain cause the gain deviations. It is not essential to cancel such characteristic deviations over the whole frequency domain, but it is generally sufficient to resume the designed characteristics in a specific frequency domain important for the control procedures. Especially deviations in the high frequency domain can be absorbed by the robust control of the whole controller. As illustrated in FIGS. 1 and 2, the characteristic compensator CC activates the constants operation unit PC to calculate the constants α and β from the parameters α1, α2, α3, β1, β2, and β1, β2 and β3 representing the operating conditions evaluated by the operating condition evaluation unit OB, and executes the characteristic compensations with the constants α and β thus obtained. The compensations for the characteristic perturbations include correction for the deviation of the stationary gain and that for the deviations of the frequency-dependent gain and phase. The constant α continuously varies the frequency-dependent gain and phase whereas the constant β is used to compensate for the deviation of the stationary gain. In combination with a filter F1 which compensates for the gain and phase in a required frequency domain, the resulting compensation is given by:

(1+α·F1)·β

Figure 10A:
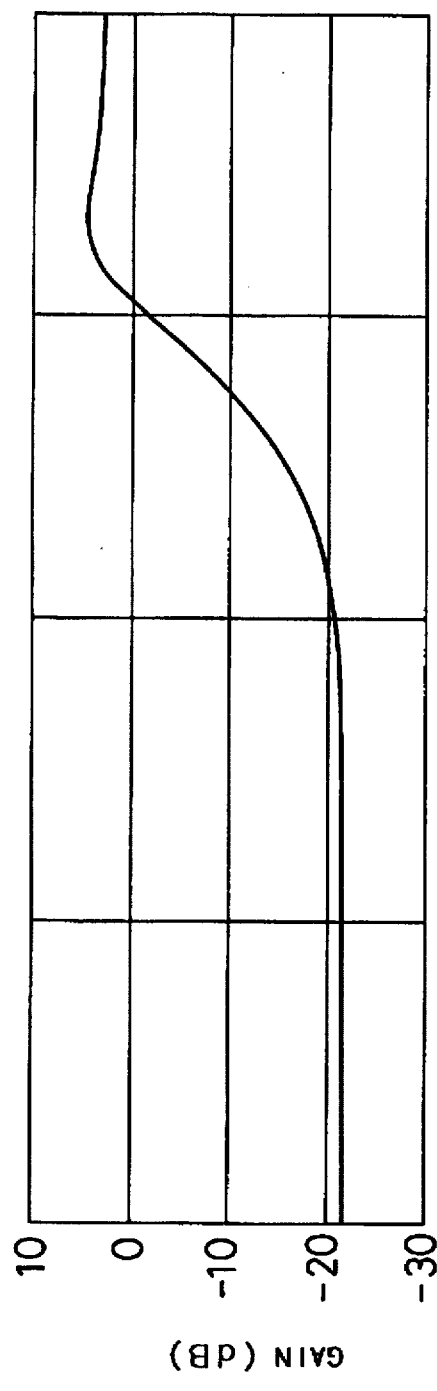
FIGS. 10A and 10B are graphs showing characteristics of a filter G0.
Figure 10B:
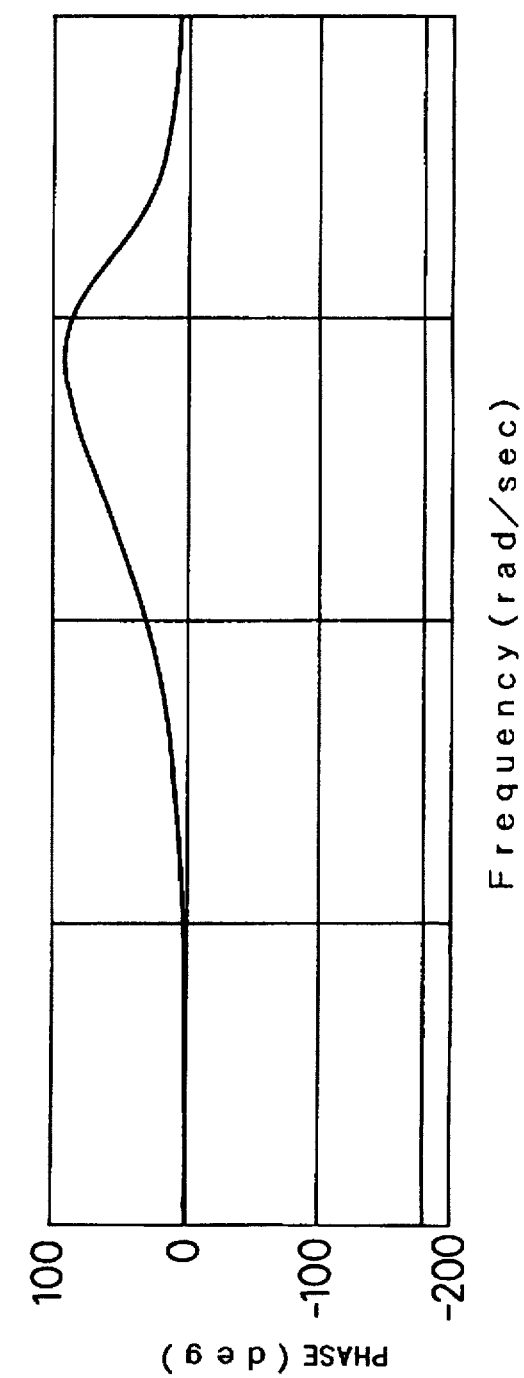

The filter operation unit FO is designed in the following manner. Differences between characteristics at the design point and those at a specific operation point are determined by transfer functions of the gain and phase (see FIGS. 40A and 40B). The constant β compensating for the stationary gain deviation is then obtained from the variation in the transfer function representing the gain perturbation. A filter G0 is subsequently designed to give characteristics with compensated deviation of the stationary gain as shown by the curve of one-dot chain line D in the graph of FIG. 41. FIGS. 10A and 10B show an example of the filter G0 having the phase advance as shown in FIG. 39. The filter G0 expands the characteristics shown in FIGS. 10A and 10B as a high-order function of the frequency domain on the CAD (computer-aided design) by the least squares method. A filter F representing approximate compensation characteristics is then obtained from the filter G0 as F≈G0−1. The filter G1 obtained in the embodiment is expressed as an eight-order or similar high-order function. The lower precision in approximation allows construction of a filter expressed as a lower-order function.

The sufficient precision in approximation of the filter and determination of the constants α and β is required in the operation domain essential for the control procedures. In the transient conditions, the control-activating conditions, and control of the lock-up clutch 32, the approximation should be focused on domains where the stability of control is easily affected, such as those having the high slip revolution speed. It is not practical to enhance the precision in approximation over the whole control range.

In the embodiment, the constants α and β, which are obtained from the parameters α1, α2, α3, β1, β2, and β3, continuously increase or decrease the compensations in the vicinity of typical compensation characteristics according to the operating conditions. An appropriate filter attaining the sufficient precision in approximation is determined through repeated simulations and tests with these parameters evaluating the filter and operating conditions. The preferable characteristic compensations are accordingly realized over a wide operation domain.

Therefore, in FIG. 1, the reference numeral 800 generally designates the deviation detecting means which detects a deviation of the control variable of the plant from a target value. Further with respect to FIG. 1, reference numeral 803 designates the plant input calculating means which calculates a plant input corresponding to specified operation characteristics of the plant, based on at least the deviation detected by the deviation detecting means.

Further with respect to FIG. 1, reference numeral 805 designates the characteristic perturbation detecting means for detecting a perturbation of the plant from the specified operation characteristics, and reference numeral 807 designates compensating means for receiving the plant input calculated by the plant input calculating means. Finally, reference numeral 809 of FIG. 1 designates outputting means for outputting the compensated plant input to the plant, so as to regulate the controlled variable of the plant to the target value.

As illustrated in FIG. 2, reference numeral 811 schematically illustrates the fact that the compensating means calculates the difference of plant input by subtracting a previously plant input obtained in a previous cycle from a current plant input obtained in a current cycle, while reference numeral 815 designates the means for compensating the difference of plant input. Additionally, reference numeral 817 schematically designates a means for generating and outputting a current compensated plant input by adding the compensated difference of plant input to a previously compensated plant input obtained in the previous cycle.

Figure 11:
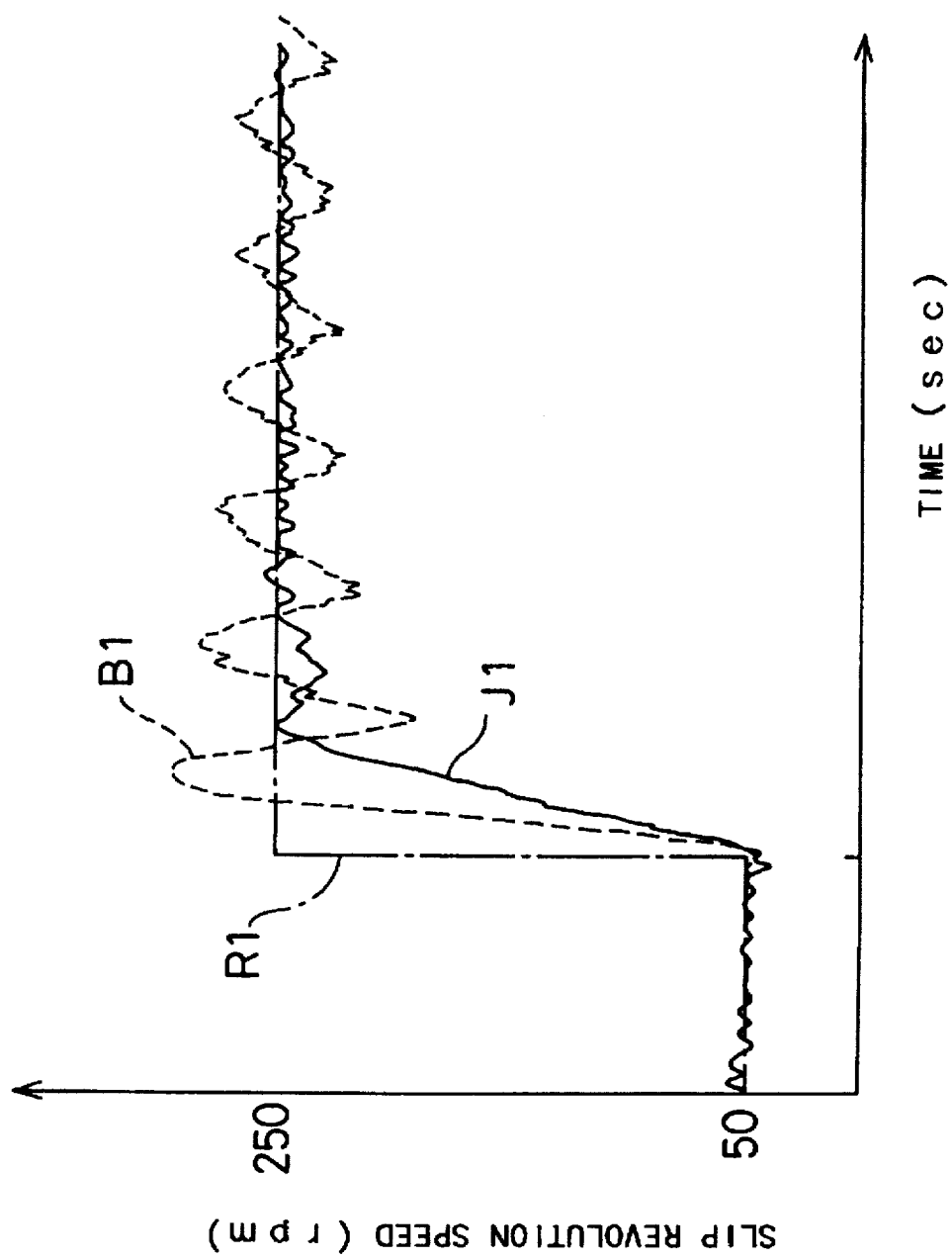
FIG. 11 is a graph showing a control by the first embodiment, compared with a control by the conventional system, under the condition that the target slip revolution speed NSLP* increases.
Figure 12:
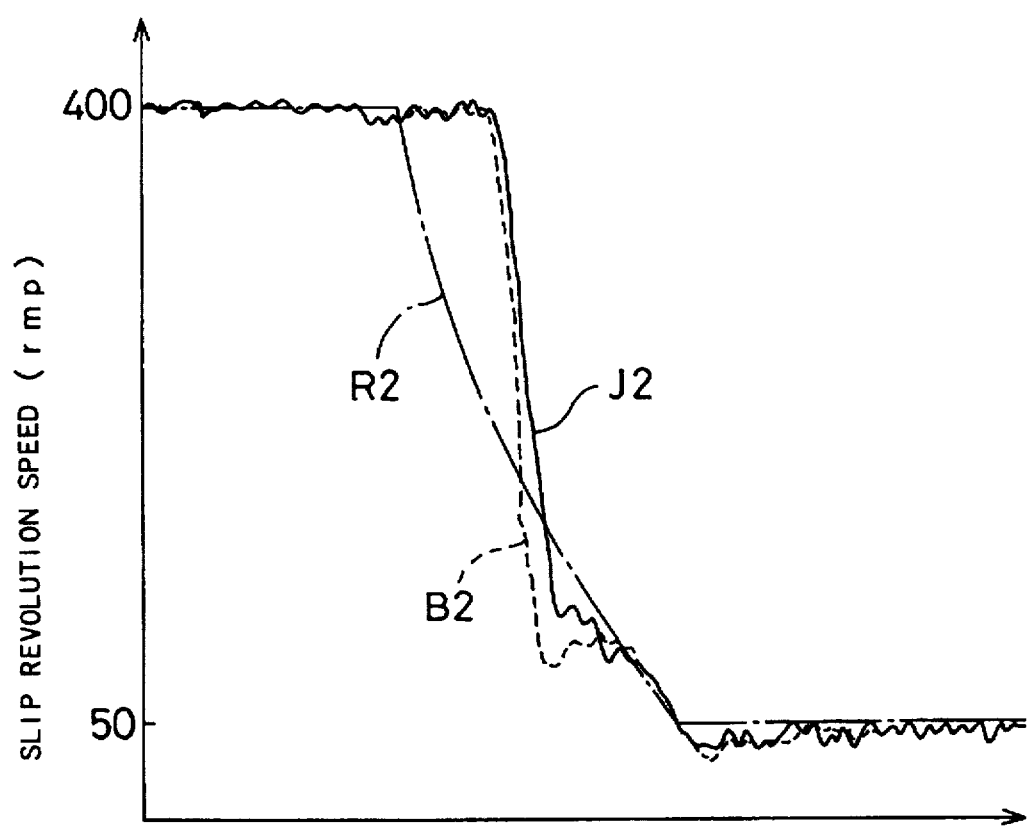
FIG. 12 is a graph showing a comparison between the control of the embodiment and the control of the conventional system under the condition that the target slip revolution speed NSLP* decreases.

FIGS. 11 and 12 are graphs showing variations in the actual slip revolution speed NSLP as the target slip revolution speed NSLP* shown by the curve of one-dot chain line R1 or R2 varies at operation points different from the design point in the slip control device of the embodiment. The curve of solid line J1 or J2 represents control characteristics realized by the embodiment whereas the curve of broken line B1 or B2 shows control characteristics in the conventional system. Even when the operating conditions are deviated from the characteristics at the design point, the slip control device of the embodiment realizes significantly high-speed and stable controls.

The above plant input calculation unit OC can be designed by various method. The above plant input calculation unit OC in this embodiment is designed according to the H∞ control theory. An optimal regulator attaches much importance to a specific trade-off between the magnitude of operation and performance of the transient response and does not directly correspond to various trade-offs generated in a real control system including a trade-off between the response and the stability of control and that between the response and the noise resistance. The H∞ control is a technique developed to overcome the limitation problem. The H∞ control introduces frequency-domain loop-shaping into design of the control system to allow concrete design utilizing the maximum gain of the frequency response, that is, H∞ norm, as an evaluation function. The standard H∞ control problem is also called the mixed sensitivity problem and the control system of the embodiment is designed on the basis of such ideas.

Figure 13:
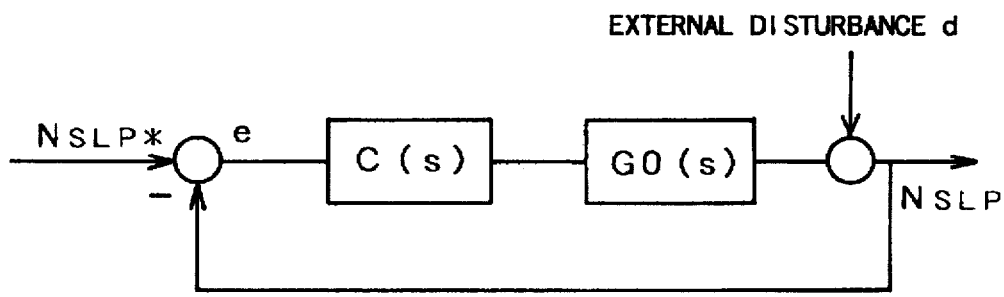
FIG. 13 is a block diagram showing a control system before characteristic perturbations as a transfer function.
Figure 14:
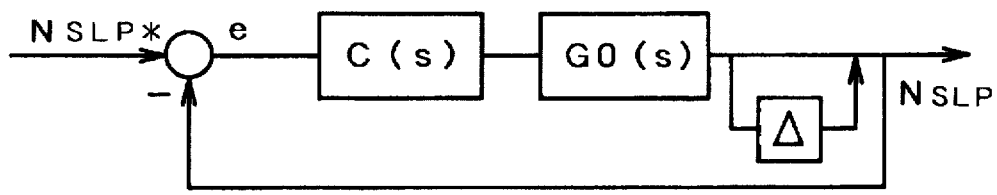
FIG. 14 is a block diagram showing the control system after the characteristic perturbations as a transfer function.

Specific design for determining the first controller coefficient ai and the second controller coefficient bi used at step S140 in the flowchart of FIG. 5 is described in detail. Design framework in a single input-output system is described prior to the concrete design process. A closed loop system shown in FIG. 13 is assumed here as a slip revolution speed control system. In the following description, NSLP*, e, C(s), G0(s) respectively denote a target slip revolution speed, a deviation of an actual slip revolution speed NSLP from the target slip revolution speed NSLP*, a transfer function of the control system (hereinafter may be referred to as the controller), and a transfer function of a plant (object to be controlled). Assume that a characteristic perturbation Δ(s) occurs in the control system as shown in FIG. 14. The characteristic perturbation is ascribed to various factors such as deterioration of a frictional member. A plant transfer function G(s) after the characteristic perturbation is expressed as a multiplicative perturbation from the initial designed characteristics, which is given by:

$$G(s) = \{I + \Delta(s)\} G0(s) \qquad (4)$$

wherein I represents a unit matrix.

Stability under the condition of generating the characteristic perturbation Δ(s) is expressed by the Small Gain theorem based on Generalized Nyquist Stability Theorem. The Small Gain theorem gives a condition for stabilizing the whole closed loop system when the controller transfer function C(s) and the plant transfer function G0(s) are respectively stable. When a transfer function of the closed loop system is expressed as L(s)=G0(s)C(s), the condition is given by:

$$\|L(s)\|_\infty = \max_\omega |L(j\omega)| < 1 \qquad (5)$$

Figure 15:
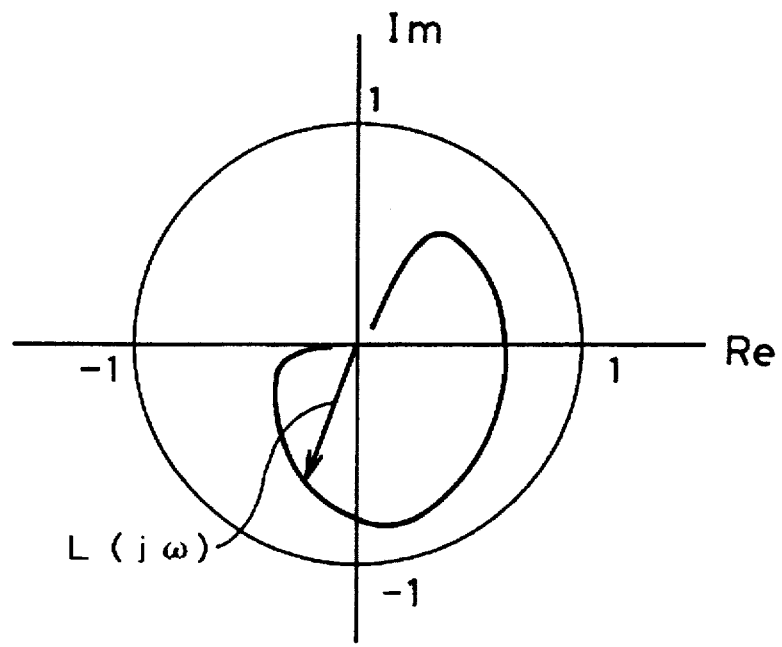
FIG. 15 is a Nyquist plot in the control system.
Figure 16:
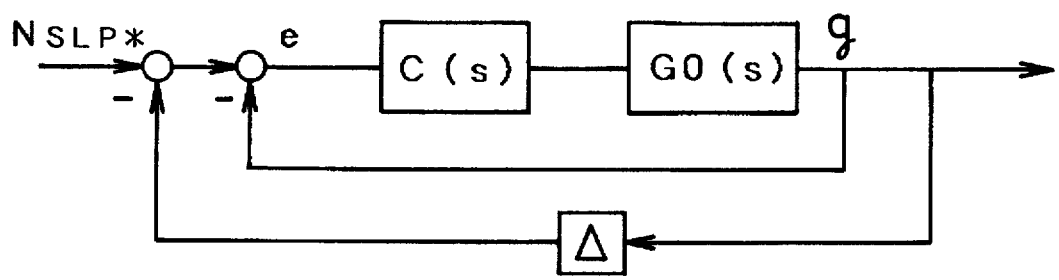
FIG. 16 is a block diagram showing a model system equivalently converted from the control system of FIG. 14.

Inequality 5 defines the H∞ norm in the single input-output system and gives the maximum gain of the loop transfer function L(s). FIG. 15 shows an exemplified Nyquist plot. As long as the locus of a vector L(jω) is within a unit circle, the closed loop system is stable. Under the generating the generating the characteristic perturbation Δ(s), the system shown in FIG. 14 can be converted equivalently to a system shown in FIG. 15. Based on the Small Gain theorem, the condition for stabilizing the system is to satisfy the following inequality:

$$\|\Delta(s)(I + G0\ C)^{-1} G0\ C\|_\infty < 1 \qquad (6)$$

wherein I denotes a unit matrix.

Figure 17:
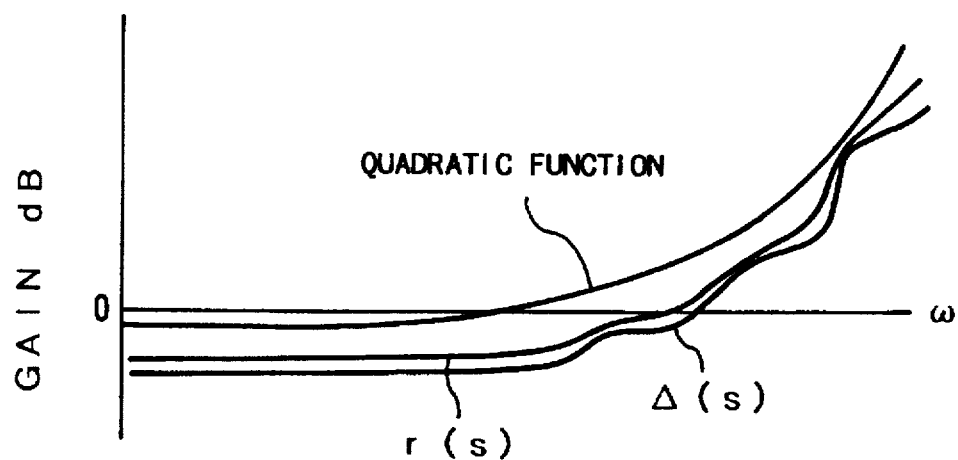
FIG. 17 is a graph illustrating a characteristic perturbation of a class r(s) over the frequency domain.

Characteristic perturbations are generally ascribed to various factors. The characteristic perturbation of the whole closed system gives a complicated curve in the frequency domain as illustrated in FIG. 17. In the graph of FIG. 17, Δ(s) shows summation of characteristic perturbations by a plurality of factors or classes. The characteristic perturbation on the control procedure is approximated by a high-order function substantially representing the actual characteristic perturbation Δ(s). In this embodiment, an eighth-order function r(s) is used. Upon condition that the eighth-order function r(s) always exceeds the actual characteristic perturbation Δ(s) in approximation, that is, as long as the following inequality is satisfied:

$$\|r^{-1}(s)\cdot\Delta(s)\|_\infty < 1 \qquad (7)$$

the absolute value |r(s)| gives a width of the characteristic perturbation allowable in the control system. Inequality 8c is given by rewriting Inequality 7 into Inequality 8a and using the relationship of Inequality 8b. In the following equations or inequalities, (s) may be omitted for the clarity of expression. For example, G(s) may be shown as G. Inequalities 8a, 8b, 8c $$|r^{-1}(j\omega)\cdot\Delta(j\omega)| \leq 1 \text{ for } \forall_\omega \therefore \|r^{-1}\cdot\Delta\|_\infty \leq 1 \qquad (8a)$$

$$\|A\cdot B\|_\infty \leq \|A\|_\infty \cdot \|B\|_\infty \qquad (8b)$$

$$\|\Delta(I+G0\ C)^{-1}\ G0\ C\|_\infty = \|\Delta r^{-1} r(I + G0\ C)^{-1}\ G0\ C\|_\infty \qquad (8c)$$
$$\leq \|r^{-1}\Delta\|_\infty \cdot \|r(I+G0\ C)^{-1}\ G0\ C\|_\infty$$
$$\leq \|r(I+G0\ C)^{-1}\ G0\ C\|_\infty$$

When the right side of Inequality 8c is not greater than 1, that is, when Inequality 9 is satisfied, the condition of Inequality 6 is fulfilled and the loop system after the characteristic perturbation shown in FIG. 14 becomes stable against any characteristic perturbation satisfying Inequality 7.

$$\|r(I+G0\ C)^{-1} G0\ C\|_\infty < 1 \qquad (9)$$

With the closed loop transfer function L(s)=G0(s)C(s), conditional Inequality 9 is rewritten as:

$$\|r(I+L)^{-1}L\|_\infty < 1$$

When $T=(I+L)^{-1}\ L$, it is further rewritten as:

$$\|r\ T\|_\infty < 1 \qquad (10)$$

wherein T is known as the complementary sensitivity function which represents a transfer function from a target slip speed to an actual slip speed. When the class r(s) approximating the characteristic perturbation increases in a specific frequency band to decrease the stability, the small complementary sensitivity function in the greatly perturbed frequency band desirably maintains the stability of the control system.

The response against the characteristic perturbation can be enhanced under the substantially fixed stability condition as described below. In the system of FIG. 13, the response characteristics in the control system are expressed by the follow-up speed of the deviation e with respect to a variation in the target slip revolution speed NSLP* and shown as transfer characteristics from the target slip revolution speed NSLP* to the deviation e. The stability margin against an external disturbance d directly affecting the slip speed is shown as transfer characteristics from the external disturbance d to a plant output y (the actual slip revolution speed NSLP in this embodiment). These two characteristics are given by the following equation and generally known as the sensitivity function S:

$$S(s)=\{I+L(s)\}^{-1} \qquad (11)$$

The smaller sensitivity function S attenuates the variation in the deviation e from the target value and in the plant output y against the external disturbance d and enhances the response characteristics of the control system. The smaller complementary sensitivity function T and sensitivity function S is accordingly desirable to realize stable and desirable response characteristics against the characteristic perturbation of the control system. The complementary sensitivity function T and the sensitivity function S satisfies the following relationship:

$$S(s)+T(s)=\{I+L(s)\}^{-1}+L(s)\{I+L(s)\}^{-1}=I \qquad (12)$$

This means that the reduction of either the complementary sensitivity function T or the sensitivity function S results in a increase in the other function. As generally known, the small sensitivity function S is desirable in a low frequency domain whereas the small complementary sensitivity function T is desirable in a high frequency domain. This means that over-evaluation of the stability condition against the characteristic perturbation, that is, excessive reduction of the complementary sensitivity function T(s) in a lower frequency domain, prevents the sensitivity function S(s) defining the response from being made small in the high frequency domain. Insufficient evaluation of the stability condition against the characteristic perturbation, on the other hand, allows the sensitivity function S(s) to fall in the high frequency domain so as to enhance the response in design, but undesirably decreases the stability over the characteristic perturbation.

Figure 18:
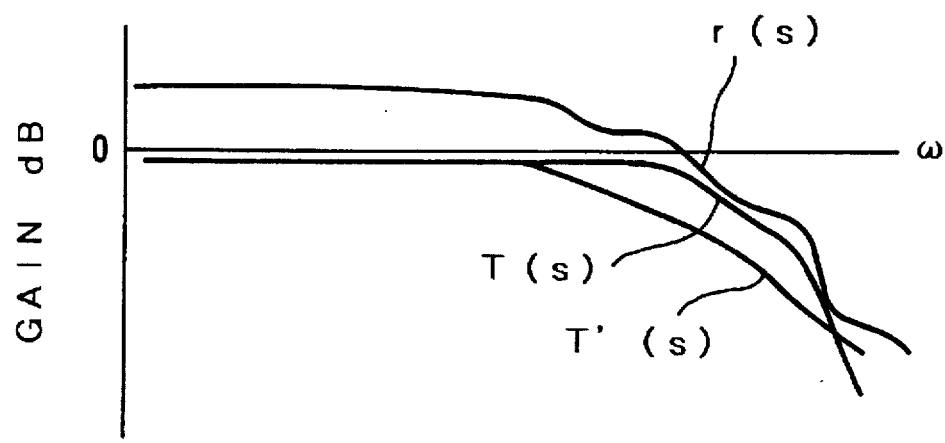
FIG. 18 is a graph illustrating a complementary sensitivity function T(s) plotted against the frequency domain.

It is accordingly required to approximate the characteristic perturbation by a high-order function as shown in FIG. 17, thereby decreasing the complementary sensitivity function T(s) only in a required frequency domain as well as making the sensitivity function S(s) small in a range of satisfying the complementary condition shown by Equation 12. In the graph of FIG. 17, r(s) is also approximated by a conventional quadratic function. The approximation by the quadratic function rises in a low frequency domain in order to cover the characteristic perturbation Δ(s) in a higher frequency domain, and thus significantly affects the complementary sensitivity function T(s) as shown in FIG. 18 compared with the approximation by a higher-order function (eighth-order function in the embodiment). In the graph of FIG. 18, T(s) and T'(s) respectively represent approximation of r(s) by a high-order function and that by a quadratic function. The complementary sensitivity function T(s) in approximation by a high-order function falls in a higher frequency domain than the complementary sensitivity function T'(s) in approximation by a quadratic function. This allows the sensitivity function S(s) to fall in the higher frequency domain by a difference between T(s) and T'(s). The approximation by a high-order function accordingly improves the response.

Conventional PID control has gentle frequency characteristics and is equivalent to approximation of the characteristic perturbation by a low-order function as shown in FIG. 17. In the PID control, the sensitivity function S(s) can thus not be lowered in the high frequency domain because of the complementary condition of Equation 12. This results in substantially no enhancing the control response and thereby no attaining the desirable slip control.

The slip control device of the embodiment takes the approach of enhancing the response while maintaining the stability over the characteristic perturbation under the complementary condition of the complementary sensitivity function T(s) and the sensitivity function S(s) shown in Equation 12. A controller having high-order frequency characteristics of the above approach is designed based on time series data including at least the plant input and the deviation, thereby realizing the desirable slip control.

Based on the general conditions described above, the controller C(s) is designed in the following manner according to the characteristics of the lock-up clutch 32 of the torque converter 12, which is a plant in the embodiment.

Figure 19:
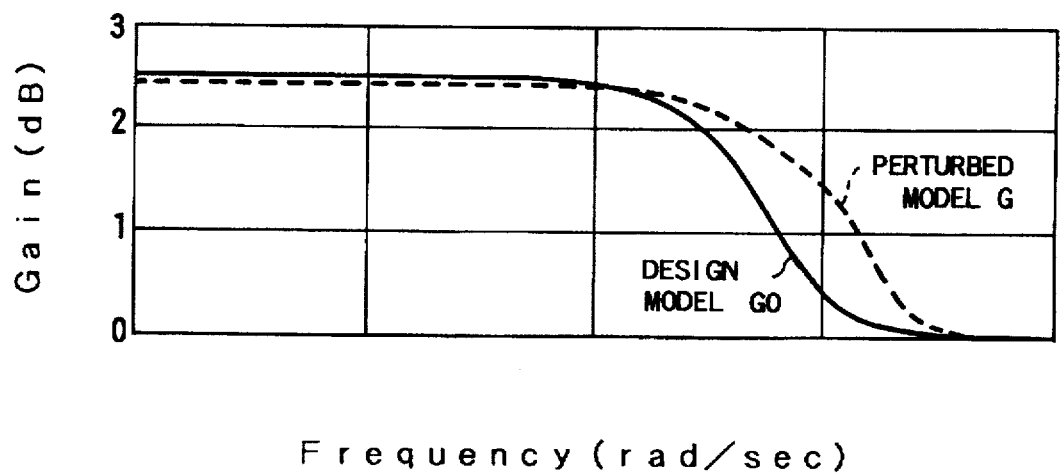
FIG. 19 is a graph showing the gain characteristics of the lock-up clutch 32 plotted against the frequency domain.
Figure 20:
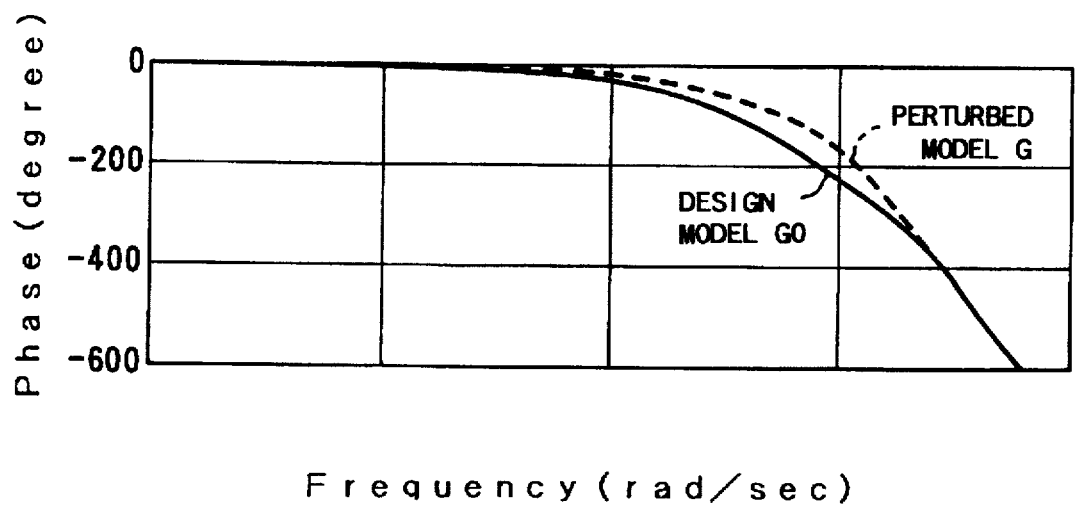
FIG. 20 is a graph showing the phase characteristics of the lock-up clutch 32 plotted against the frequency domain.
Figure 21:
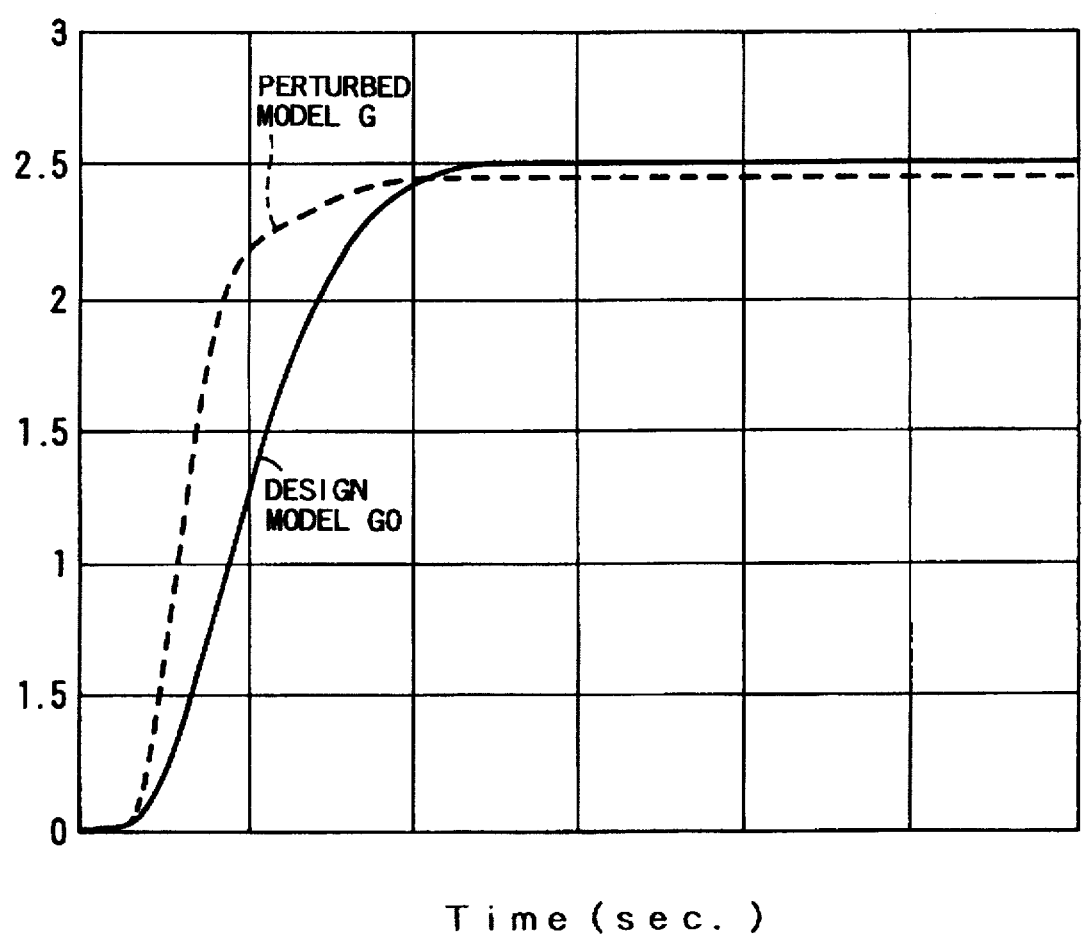
FIG. 21 is a graph showing an example of the control procedures in the lock-up clutch 32 using a design model G0 and a perturbed model G.

FIGS. 19 and 20 show the characteristics of the plant as an example. FIG. 19 are Bode plots of gain-frequency characteristics from the plant input of the lock-up clutch 32 or the solenoid current to the slip revolution speed NSLP at the vehicle speed of 45 km/h. FIG. 20 are also Bode plots of the phase-frequency characteristics. The lock-up clutch 32 is operated at a fixed vehicle speed under a load increasing condition. In FIGS. 19 and 20, the broken line represents a characteristic perturbation of the plant of the embodiment whereas the solid line represents design model characteristics. Both the gain and the phase of the plant are significantly varied from those of the design model. FIG. 21 shows the response against a stepped variation in the instruction value along a time axis under the condition that no feedback control is applied to the plant. The graph of FIG. 21 shows a sharp rise against the load variation when the characteristic variations shown in FIGS. 19 and 20 occur.

In the control system of the embodiment, large characteristic perturbations are expected in a high frequency domain as shown in FIGS. 39 through 42 and the characteristic perturbation class r(s) is expressed as a high-order function as shown in FIG. 17.

In the embodiment, the characteristic variation is approximated by an eighth-order function, and an evaluation function of Inequality 13 given below is applied to decrease the complementary sensitivity function T in a high frequency domain having a large characteristic variation and lower the sensitivity function S in a range of satisfying the complementary condition shown by Equation 12. In the description below, the characteristic perturbation class r(s) related to the sensitivity function S and the complementary sensitivity function T is expressed as weighting functions W1 and W2. By using the weighting function W2(s), the restriction condition of the complementary sensitivity function T for defining the stability over the characteristic perturbation is given by:

$$\|W2(s)T(s)\| < 1$$

By using the weighting function Wi(s), the restriction condition of the sensitivity function S representing the response is expressed as:

$$\|W(s)S(s)\|_\infty < 1$$

Figure 23:
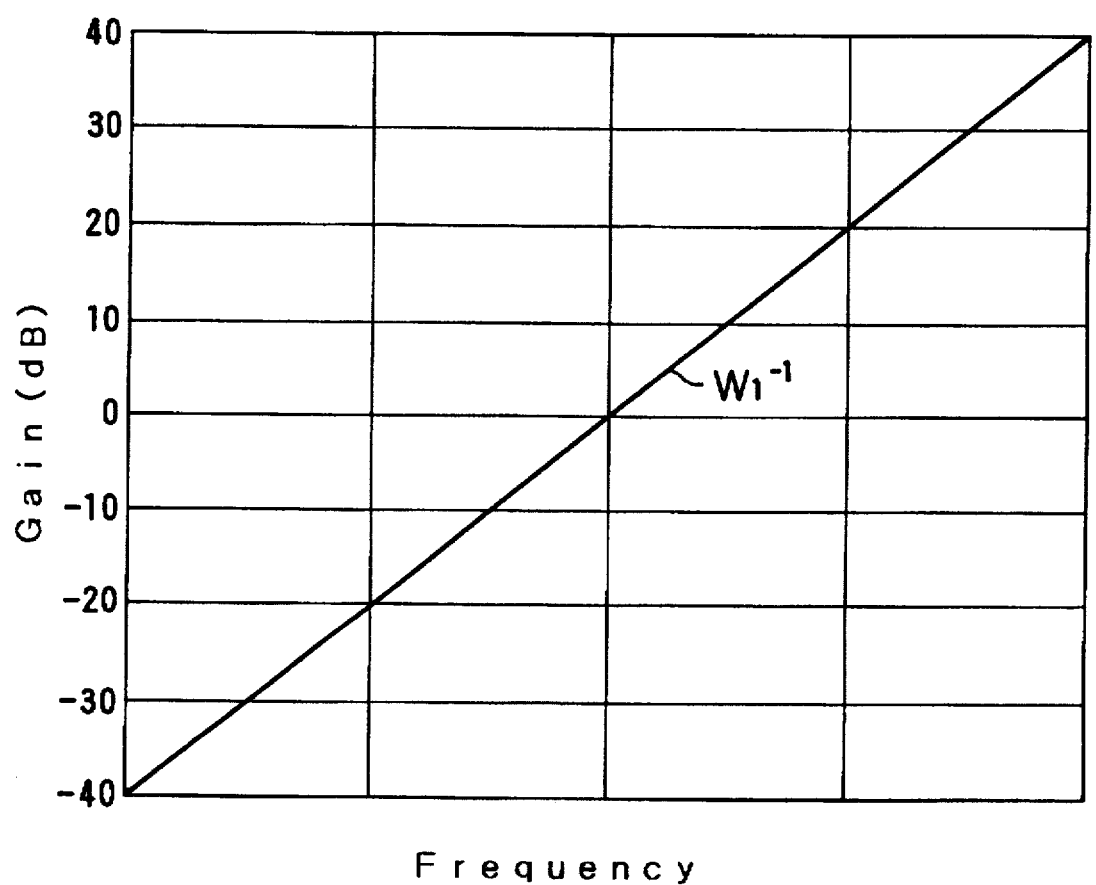
FIG. 23 is a graph showing an exemplified setting of the weighting function W1.
Figure 24:
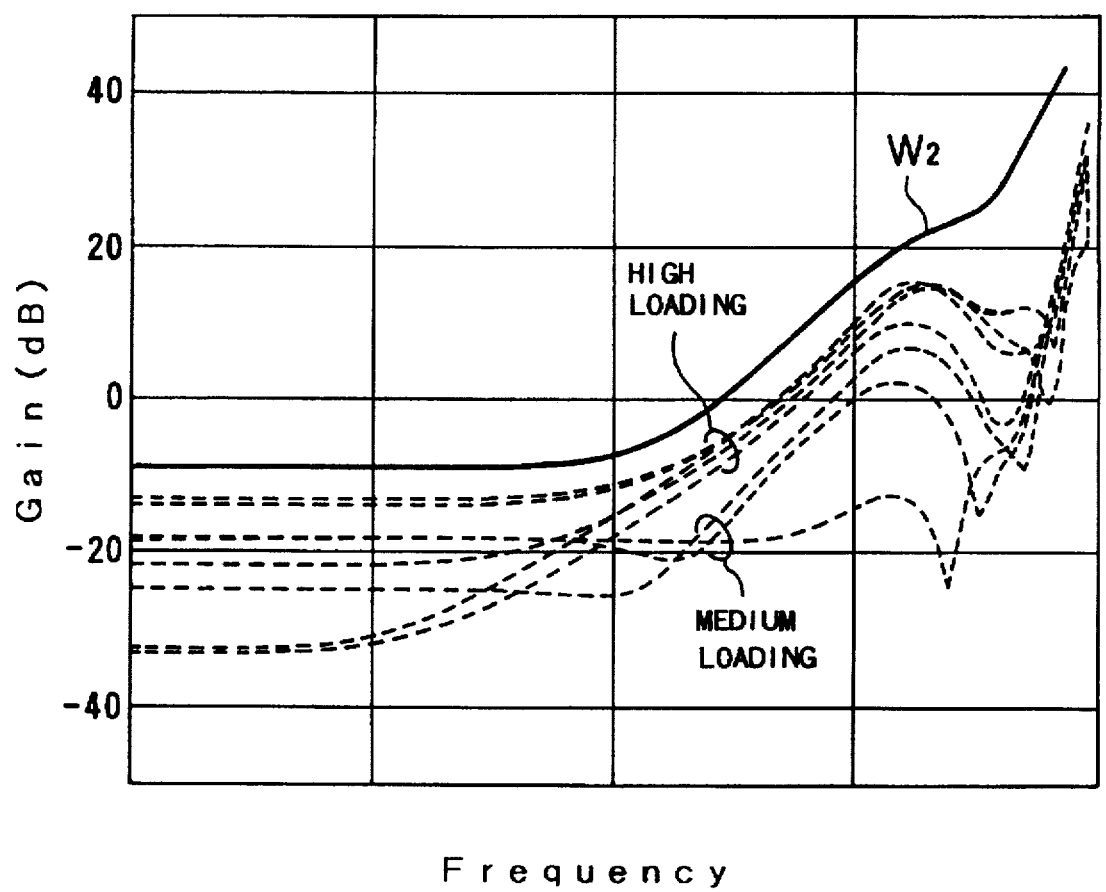
FIG. 24 is a graph showing various characteristic perturbations of the control system by the difference in load and the weighting function W2 set based on the characteristic perturbations.

Exemplified designs of the weighting functions W1 and W2 are shown in FIGS. 23 and 24. The weighting functions W1 and W2 are complementary to each other as clearly seen in FIG. 23. Since the norm satisfies Inequality 13a given below, the above restriction conditions are fulfilled by Inequality 13b also given below.

$$\max\{\|x\|_\infty, \|y\|_\infty\} < \left\|\begin{array}{c} x \\ y \end{array}\right\|_\infty \tag{13a}$$

$$\left\|\begin{array}{c} W1(s)S(s) \\ W2(s)T(s) \end{array}\right\|_\infty < 1 \tag{13b}$$

The controller C(s) satisfying the requirements of the control performance and robust can be designed by applying Equation 14 given below to a transfer function from exogenous inputs w to a controlled variable z under the feedback control condition.

$$Tzw = \left[\begin{array}{c} W1(s)S(s) \\ W2(s)T(s) \end{array}\right] \tag{14}$$

Figure 22:
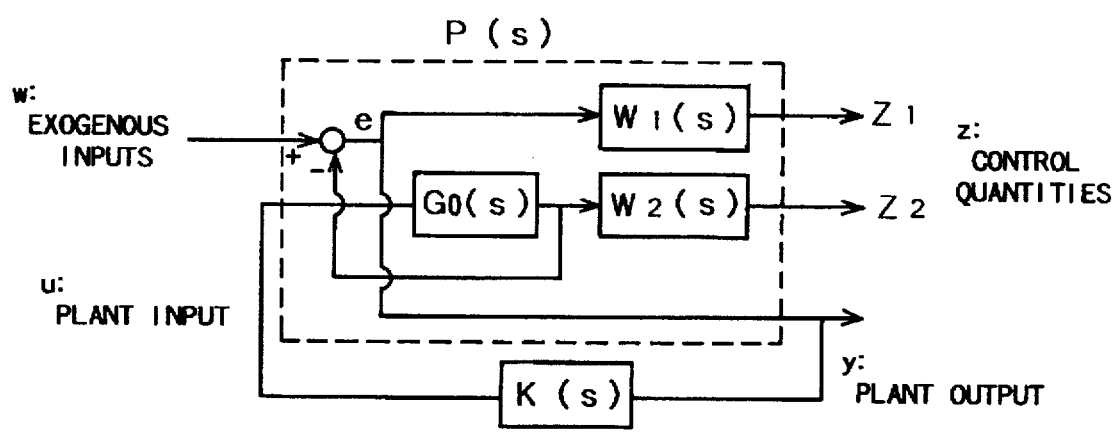
FIG. 22 is a block diagram showing an augmented control system.

FIG. 22 is a block diagram of the control system by taking account of the weighting functions W1 and W2. In FIG. 22, w denotes exogenous inputs such as the target slip revolution speed NSLP* and disturbance, z (z1, z2) physical quantities to be controlled (the product of the deviation and the weighting function W1 in the frequency domain and the product of the slip revolution speed and the weighting function W2 in the frequency domain), y a plant output observed or the slip revolution speed NSLP detected by a sensor, and u a plant input (duty ratio for determining the current of the linear solenoid valve 52). G0(s), P(s), and K(s) respectively represent a plant, an augmented plant, and a controller. The control system is expressed by a state equation using a variable of state x:

$$\begin{array}{rcl} dx/dt & = & A \cdot x + B1 \cdot w + B2 \cdot u \\ z & = & C1 \cdot x + D11 \cdot w + D12 \cdot u \\ y & = & C2 \cdot x + D21 \cdot w + D22 \cdot u \end{array} \tag{15}$$

The control system is also expressed as a transfer function:

$$\left[\begin{array}{c} z(s) \\ y(s) \end{array}\right] = P(s) \cdot \left[\begin{array}{c} w(s) \\ u(s) \end{array}\right] \tag{16}$$

The transfer function matrix of P (s) is shown as an augmented plant including the plant G0(s) and the weighting functions W1 and W2:

$$P(s) = \left[\begin{array}{cc} W1 & -W1G0 \\ 0 & W2G0 \\ 1 & -G0 \end{array}\right] \tag{17}$$

When the feed back control u(s)=K(s)y(s) is executed by the controller K(s) shown in the block diagram of FIG. 22, the H∞ control problem is to guarantee the stability of the closed loop system with respect to the transfer function Tzw from exogenous inputs w to a control quantity z and obtain the controller K(s) satisfying the inequality $\|Tzw\|_\infty < 1$.

Figure 25:
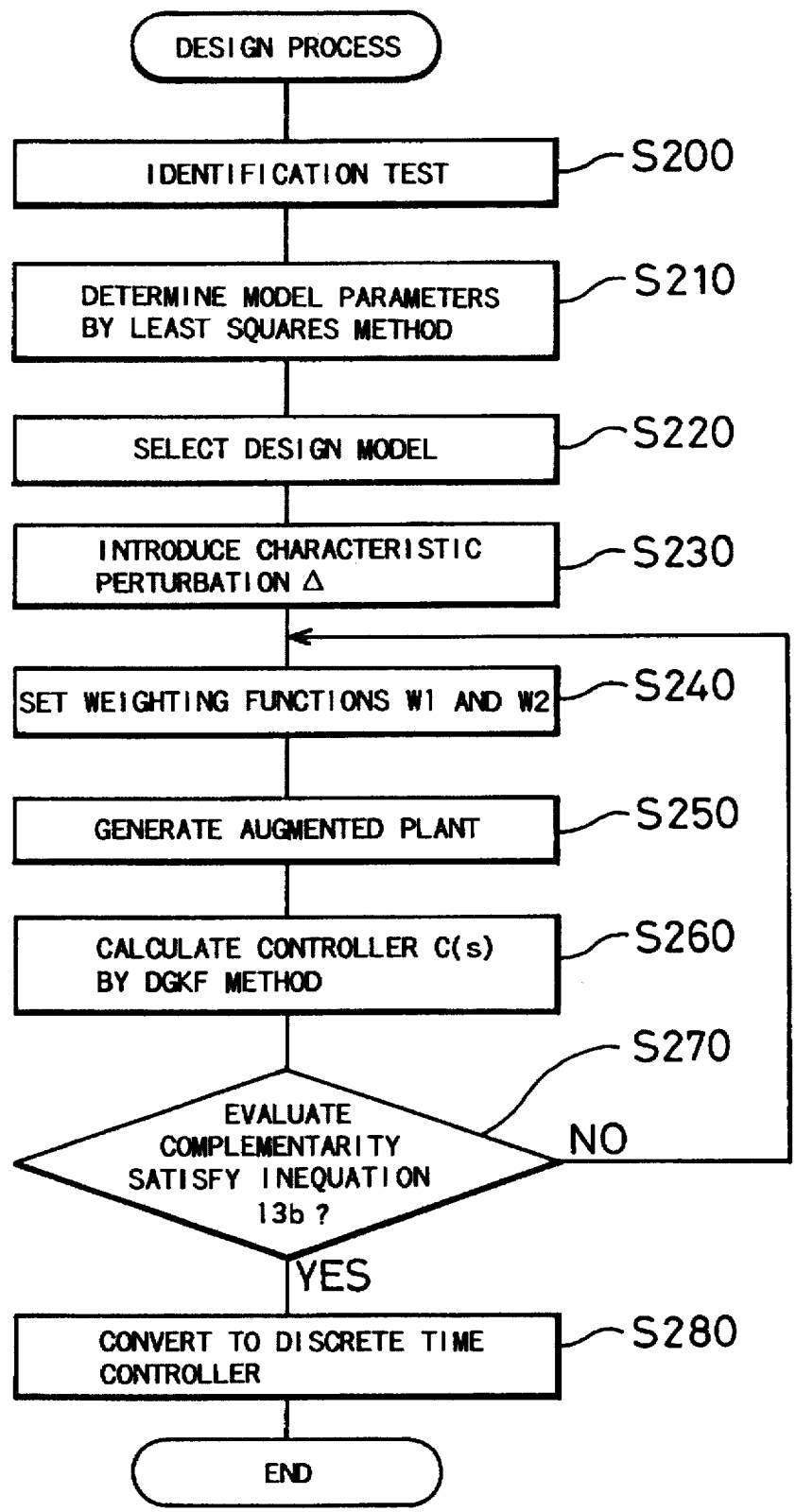
FIG. 25 is a flowchart showing concrete steps of designing the controller in the first embodiment.

Concrete design process of the clutch slip control device based on the above theory is explained with the flowchart of FIG. 25.

At a first design step (steps S200 and S210), plant characteristics are identified as a numerical model. The numerical model is ideally introduced based on physical or dynamic considerations of a plant. It is, however, difficult to physically describe the dynamics of a frictional joint of the frictional clutch of the embodiment. The experimental identification method is accordingly applied to the embodiment. Physical considerations-based identification of the clutch dynamics as a numerical model may be allowed for other type of plants (clutches) or by introduction of an appropriate controlled variable.

In the embodiment, an identification test is executed first at step S200. A specific signal corresponding to a plant input is generated by a random signal generator. Upon condition that a driving current Isol runs through the linear solenoid valve 52 based on the specific signal, the actual slip revolution speed NSLP is calculated from the engine speed Ne and the input shaft rotating speed Nin. Data of the slip revolution speed NSLP are stored in a storage device as the RAM 86. This identification test is executed under primary operating conditions of a real vehicle and driving conditions of various classes giving characteristic perturbations.

At step S210, a number of data stored in the storage device are processed by least squares method and model parameters ami and bmi, which can represent the output or the slip revolution speed NSLP, are determined according to the following equation:

$$y(k) = \sum_{i=1}^{n} ami \cdot y(k-i) + \sum_{i=0}^{n} bmi \cdot u(k-i-kd) \quad (18)$$

where u, y, k, and n respectively denote a plant input, a slip revolution speed NSLP or a plant output, a parameter representing the current time, and an order; ami and bmi represent model parameters; and Kd represents a dead time before variation in the plant input u actually affects the plant output y.

At step S220, a design model is selected among a number of models determined to be available by the system identification. A characteristic perturbation Δ is then introduced from the design model at step S230. The design model is selected generally based on a primary operating condition. When the operating condition for realizing a smaller characteristic perturbation is significantly different from the primary operating condition, the former may be selected as a design model G0. Once the design model G0 is determined, various characteristic perturbations are obtainable from a perturbed variation model G based on the definition of Equation 4. The characteristic perturbation A shown in FIG. 17 is summation of a plurality of characteristic perturbations. FIGS. 19 through 21 illustrate the responses under specific conditions of the models thus determined.

At step S240, the weighting functions W1 and W2, which are key functions of the H∞ controller, are set according to the characteristic perturbation Δ determined at step S230. Here especially important is the weighting function W2 corresponding to the complementary sensitivity function T(s). The weighting function W2 is approximated by an eighth-order function to include characteristic perturbations due to load, turbine revolution speed, and other factors as shown in FIG. 24. In other words, the weighting function W2 in FIG. 24 is illustrated as a curve approximating envelopes of various characteristic perturbations. The weighting functions W1 is, on the other hand, relatively simple as illustrated in FIG. 23. The weighting function W1 is modified several times in a general design cycle to satisfy the design specification.

After the design of the weighting functions W1 and W2, an augmented plant of Equation 17 is created at step S250 and an available controller is then calculated by a predetermined solution at step S260. A typical solution used for the calculation of a controller is DGKF method proposed by Doyle and Glover et al. The DGKF method is described in detail in 'State Space solutions to standard H2 and H∞ control problem' (J. Doyle, K. Glover et al., IEEE Trans. Automat. Contr., AC-34, No. 8, pp.831–847).

After the calculation of the controller, it is determined at step S270 whether the controller satisfies Inequality 13b. In general procedures, the weighting function W1 for defining the sensitivity function S(s) is provisionally set under relatively loose conditions and an available controller is calculated based on the provisional weighting function W1 at an initial stage of design. The setting of the weighting function W1 is then varied gradually so as to make the sensitivity function S(s) small under the condition of Inequality 13b. This procedure is repeated until the sensitivity function S(s) reaches the minimum under the condition of Inequality 13b.

After the controller realizing the sufficient performance is obtained by repeating the process of steps S240 through S270, the controller is converted to a discrete time controller, which is utilized in the real system, at step S280.

The process of steps S210 through S280 can be executed with a control system CAD 'MATLAB' ('MATLAB' is trade mark of MATH WORKS INC.).

In this embodiment, the coefficients ai and bi are determined as n=8, that is, with data in the current cycle through in the cycle executed eight times before. The following data show the design point for the slip revolution speed control and the constants ai and bi at the design point in the embodiment. The constants ai and bi are expressed with the exponent e.

Input shaft rotating speed Nin=1,300 rpm

Amount of air intake Qn=0.3 gr/rev

Target slip revolution speed NSLP*=50 rpm a1=−5.5997e−1, a2=1.3342e−1, a3=1.0814e+0, a4=1.1159e+0, a5=3.5109e−2, a6=−3.9346e−1, a7=−3.6665e−1, a8=4.5979e−2, b0=−2.0511e−2, b1=−5.9367e−3, b2=7.0473e−3, b3=1.5795e−2, b4=1.0315e−2, b5=−1.2458e−2, b6=−6.3366e−3, b7=−1.8148e−3, b8=5.9512e−3

The H∞ controller thus designed realizes controls having excellent stability and response. In the embodiment, the plant input calculation unit OC executes the H∞ control and the characteristic compensator CC works to compensate for the characteristic perturbations. The slip control device of the embodiment ensures the preferable control characteristics over the time-based variations, such as wear of the clutch, as well as deviations of the characteristics from the design point according to the variations in operating conditions.

Although the plant input calculation unit OC determines the plant input through the H∞ control in the above embodiment, the conventional PID control may also be applicable. In the PID control, the operation executed at step S140 in the flowchart of FIG. 5 is replaced by calculation expressed as Equation 19. In Equation 19, Kp, Ki, and Kd respectively denote a proportional coefficient of a deviation e of the actual slip revolution speed from a target slip revolution speed, an integral coefficient of the deviation e, and a differential coefficient of the deviation e. In the embodiment, Kp=16, Ki=60, and Kd=5.

$$u(k) = Kp \cdot e(k) + Ki \cdot \sum_{i=1}^{k} e(i) + Kd \cdot \{e(k) - e(k-1)\} \quad (19)$$

Figure 26:
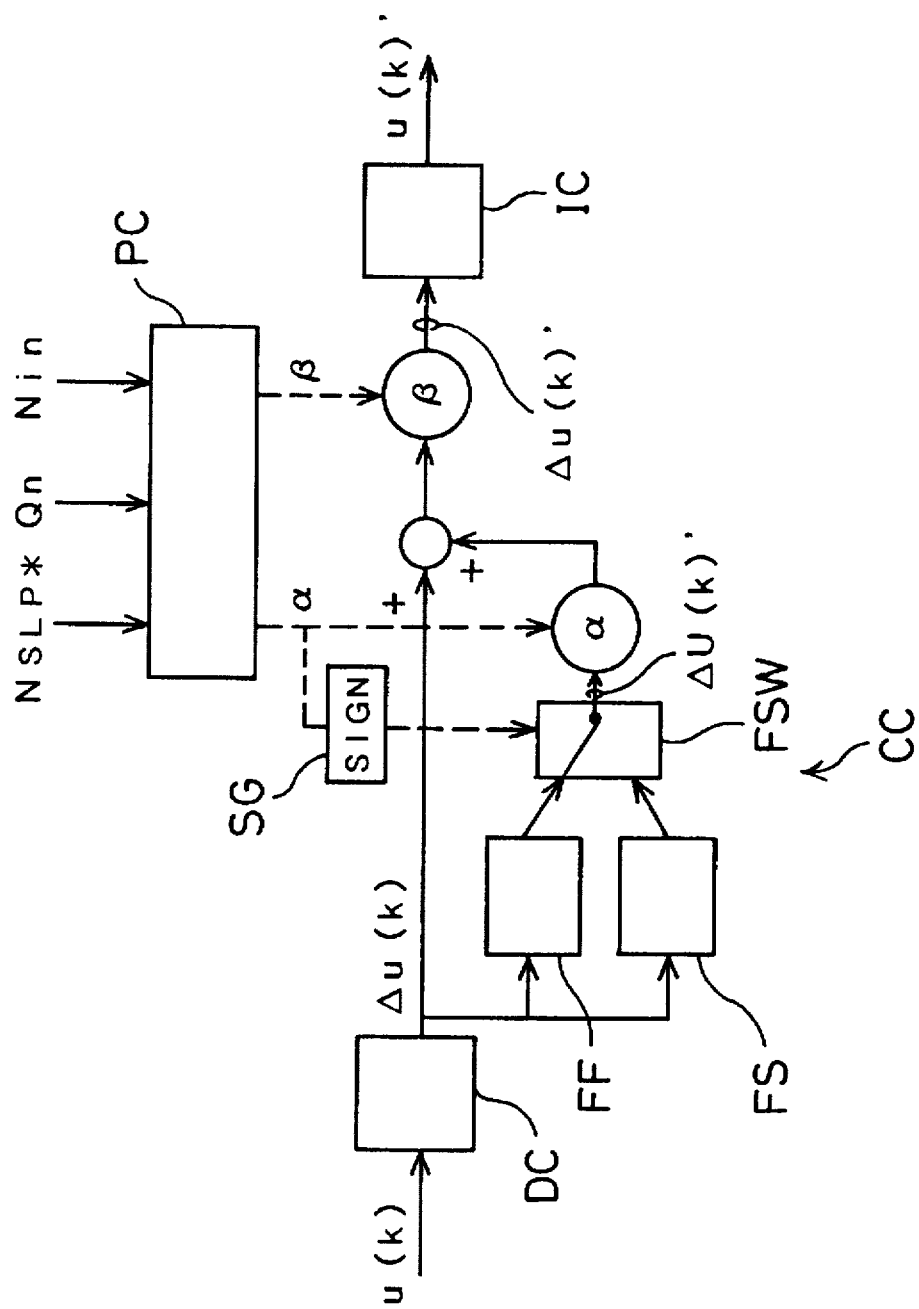
FIG. 26 is a block diagram showing an internal structure of a characteristic compensator CC in another slip control device as a second embodiment according to the invention.

A slip control device constructed as a second embodiment according to the invention has the hardware structure similar to that of the first embodiment, except structures of the operating condition evaluation unit OB and the constants operation unit PC working to determine the constants α and β and the characteristic compensator CC working to compensate for the characteristic perturbations in the control system with the constants α and β. As illustrated in FIG. 26, the characteristic compensator CC of the second embodiment includes a differential operation unit DC and an integral operation unit IC as the first embodiment shown in FIG. 2, as well as two filter operation units FF and FS, a filter switcher unit FSW, and a sign identification unit SG for identifying the sign of the constant α. The constants operation unit PC calculates the constants α and β from the target slip revolution speed NSLP*, the amount of air intake Qn, and the input shaft rotating speed Nin.

Figure 27:
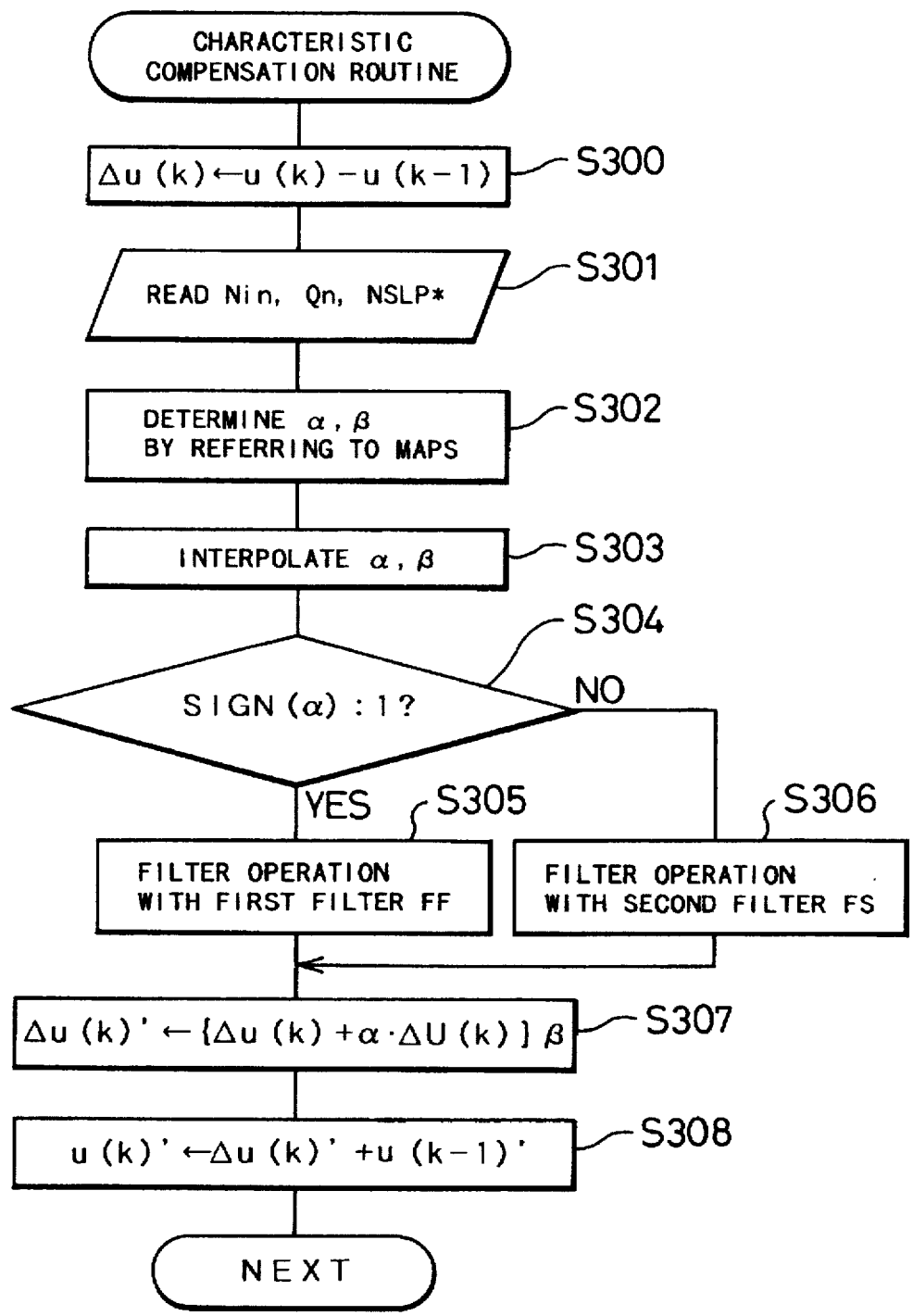
FIG. 27 is a flowchart showing a characteristic compensation routine executed in FIG. 27.

The CPU 82 of the electronic control unit 42 executes a characteristic compensation routine shown in the flowchart of FIG. 27. In the structure of the second embodiment, the electronic control routine 42 executes the slip control routine of the first embodiment shown in the flowchart of FIG. 5 and the characteristic compensation routine of FIG. 27 instead of the characteristic compensation process executed at step S145 of FIG. 5. The program enters the characteristic compensation routine and first goes to step S300, at which a difference of plant input Δu(k) is determined by subtracting a previous plant input u(k−1) from a current plant input u(k−1) determined at step S140 in the flowchart of FIG. 5. The difference of plant input has the smaller absolute value than the plant input itself, thereby improving the precision of operation.

At step S301, the electronic control unit 42 reads data of the input shaft rotating speed Nin, the amount of air intake Qn, and the target slip revolution speed NSLP*. The input shaft rotating speed Nin is generally identical with data read at step S100 in the slip control routine of FIG. 5, and the target slip revolution speed NSLP* is obtained at step S110 in FIG. 5. The electronic control unit 42 then determines the constants α and β by referring to maps of the physical properties at step S302. The maps referred to at step S302 are shown in FIGS. 28A and 28B. The maps are prepared for each input shaft rotating speed Nin to give values of the constants α and β according to the target slip revolution speed NSLP* and the amount of air intake Qn. Characteristics of operations of the lock-up clutch 32 are significantly affected by the input shaft rotating speed Nin or the rotating speed Nt of the turbine runner 22. The electronic control unit 42 accordingly reads data of the constants α and β from maps of corresponding input shaft rotating speeds just smaller and greater than the current input shaft rotating speed Nin and executes interpolation according to the input shaft rotating speed Nin at step S303.

Figure 29A:
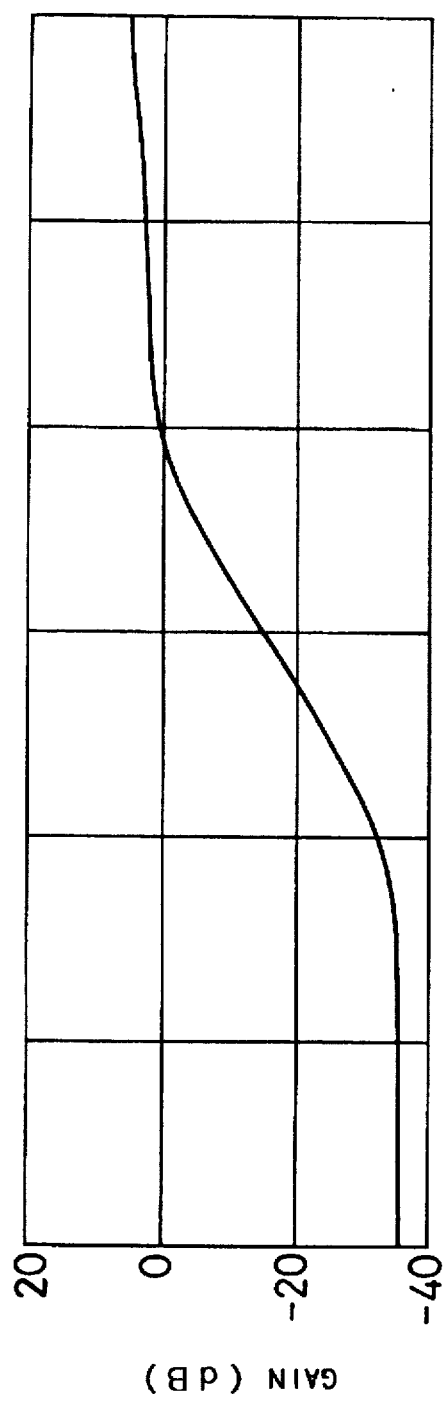
FIGS. 29A and 29B are graphs showing characteristics of a second filter FS in the second embodiment.
Figure 29B:
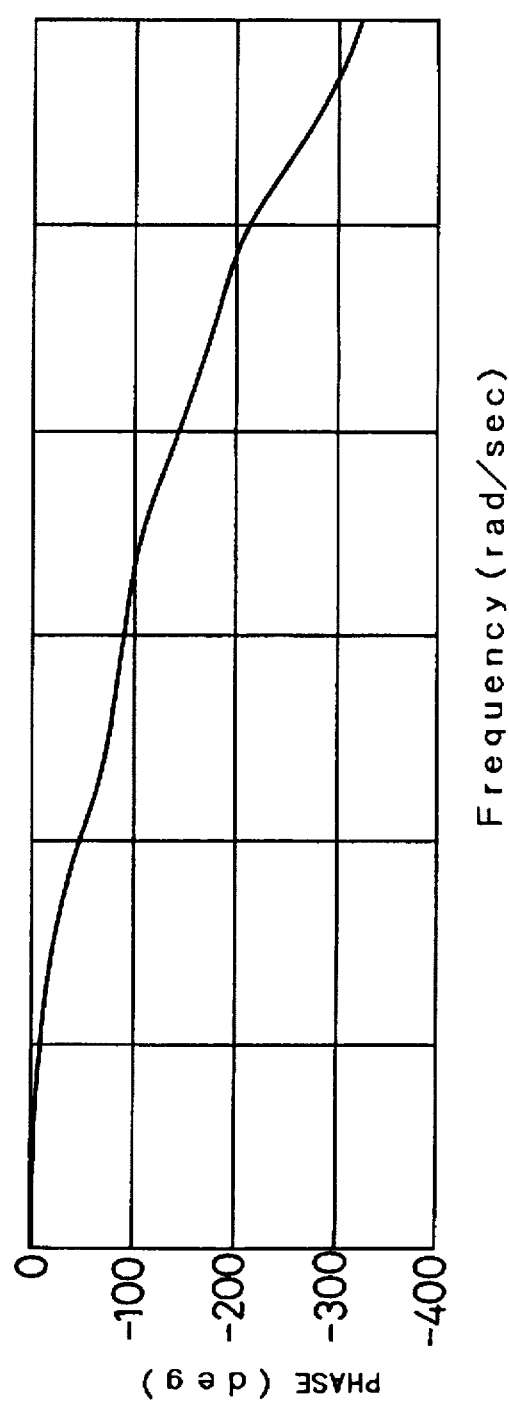

The program then goes to step S304 at which the sign of the constant α thus obtained is identified. When the sign of the constant α is positive, that is, when SIGN(α)=1, the program proceeds to step S305 at which the first filter FF executes the filter operation with respect to the difference of plant input Δu(k) calculated by the differential operation unit DC at step S300. The first filter FF has the characteristics of phase advance shown in FIGS. 10A and 10B. When the sign of the constant α is determined to be negative at step S304, on the contrary, the program proceeds to step S306 at which the second filter FS executes the filter operation with respect to the difference of plant input Δu(k). The second filter FS has the characteristics of phase delay as shown in FIGS. 29A and 29B. The process of switching the first filter FF over the second filter FS or vice versa according to the sign of the constant α corresponds to the sign identification unit SG and the filter switcher unit FSW.

Like the first embodiment (step S207 in the flowchart of FIG. 6), the electronic control unit 42 calculates a modified difference of plant input Δu(k)' at step S307 from an output ΔU(k) obtained through the filter operation with the first or the second filter FF or FS at step S305 or S306, the difference of plant input Δu(k), and the constants α and β according to Equation 3 given above.

At step S308, a current modified plant input u(k)' is determined by adding a previous modified plant input u(k−1)' obtained in a previous cycle to the modified difference of plant input Δu(k)'. This process corresponds to an integral operation unit IC shown in FIG. 26. The modified plant input u(k)' thus obtained is output to the linear solenoid valve 52 at step S150 in the slip control routine of FIG. 5.

Even when the system for controlling the plant or the actual slip revolution speed NSLP has the operation point deviated from the design point to give characteristic perturbations, the structure of the second embodiment, like the first embodiment, allows the plant input calculation unit OC to execute the required operations on the assumption that the plant exists at the design point. This realizes high-speed and continuous controls. The characteristic compensator CC compensates for the characteristic perturbations accompanied with the variation in operation point of the plant, so as to fix the plant at the design point with respect to the plant input calculation unit OC. This realizes preferably high precision in control, thereby sufficiently enhancing the response with desirable stability. The structure of the second embodiment corrects the variations in constants α and β according to the input shaft rotating speed Nin through the interpolation process. This allows the characteristic compensator CC to compensate for the characteristic perturbations of the plant with a sufficient precision. The second embodiment selects either one of the first filter FF and the second filter FS according to the sign of the constant α and executes the filter operation with the selected filter. This ensures controls over a wide range of characteristic perturbations of the plant.

Figure 30:
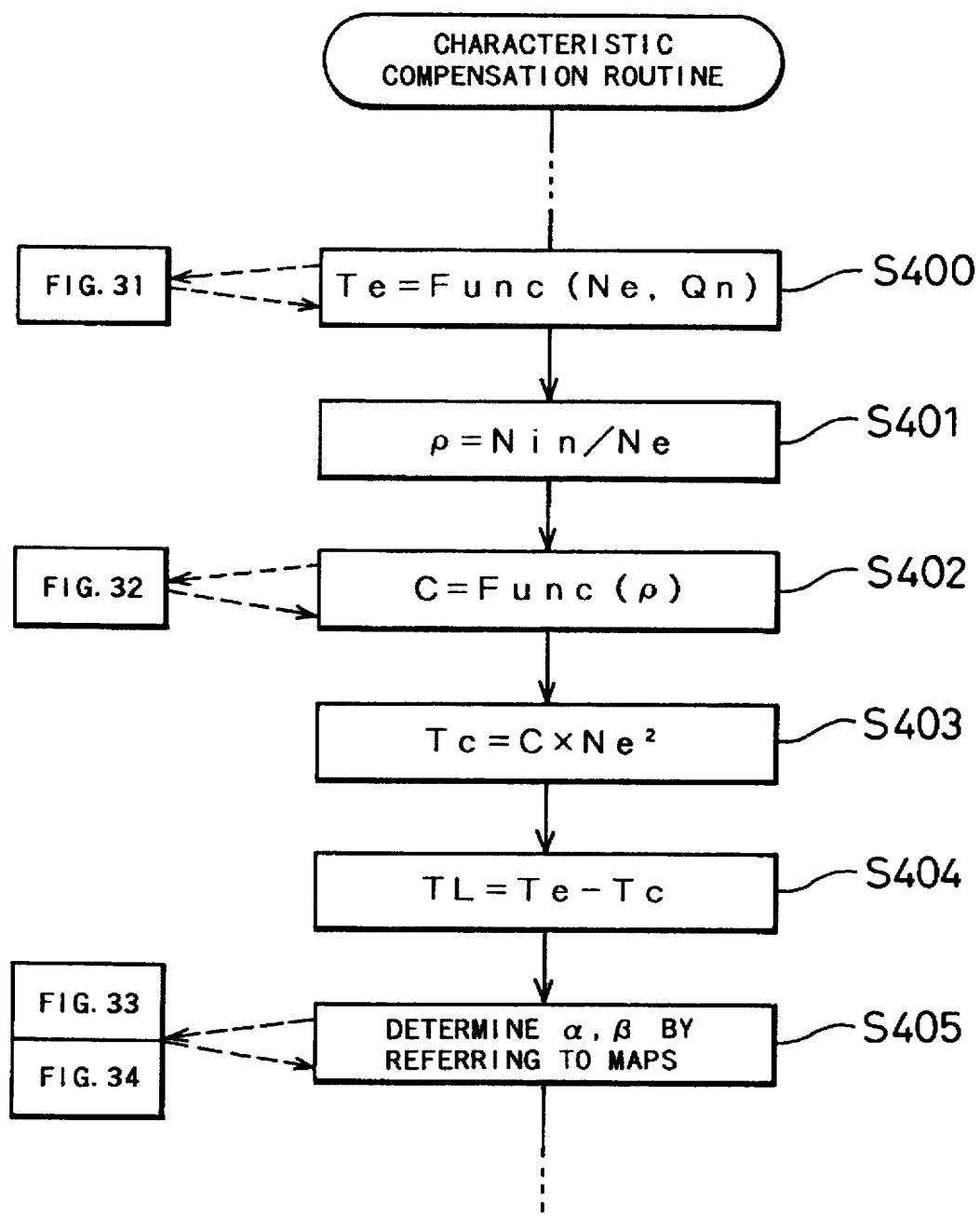
FIG. 30 is a flowchart showing an essential part of a characteristic compensation routine executed in a third embodiment.

Another slip control device for executing slip control of the lock-up clutch in the torque converter is constructed as a third embodiment according to the invention. The slip control device of the third embodiment has the hardware structure and executes the operations by the plant input calculation unit OC and the filter operations by the characteristic compensator CC, similar to those of the second embodiment. The third embodiment, however, follows a different process of determining the constants α and β. FIG. 30 is a flowchart showing part of a characteristic compensation routine executed in the third embodiment for determining the constants α and β. This part corresponds to steps S301 through S303 in the characteristic compensation routine of the second embodiment shown in FIG. 27.

Figure 31:
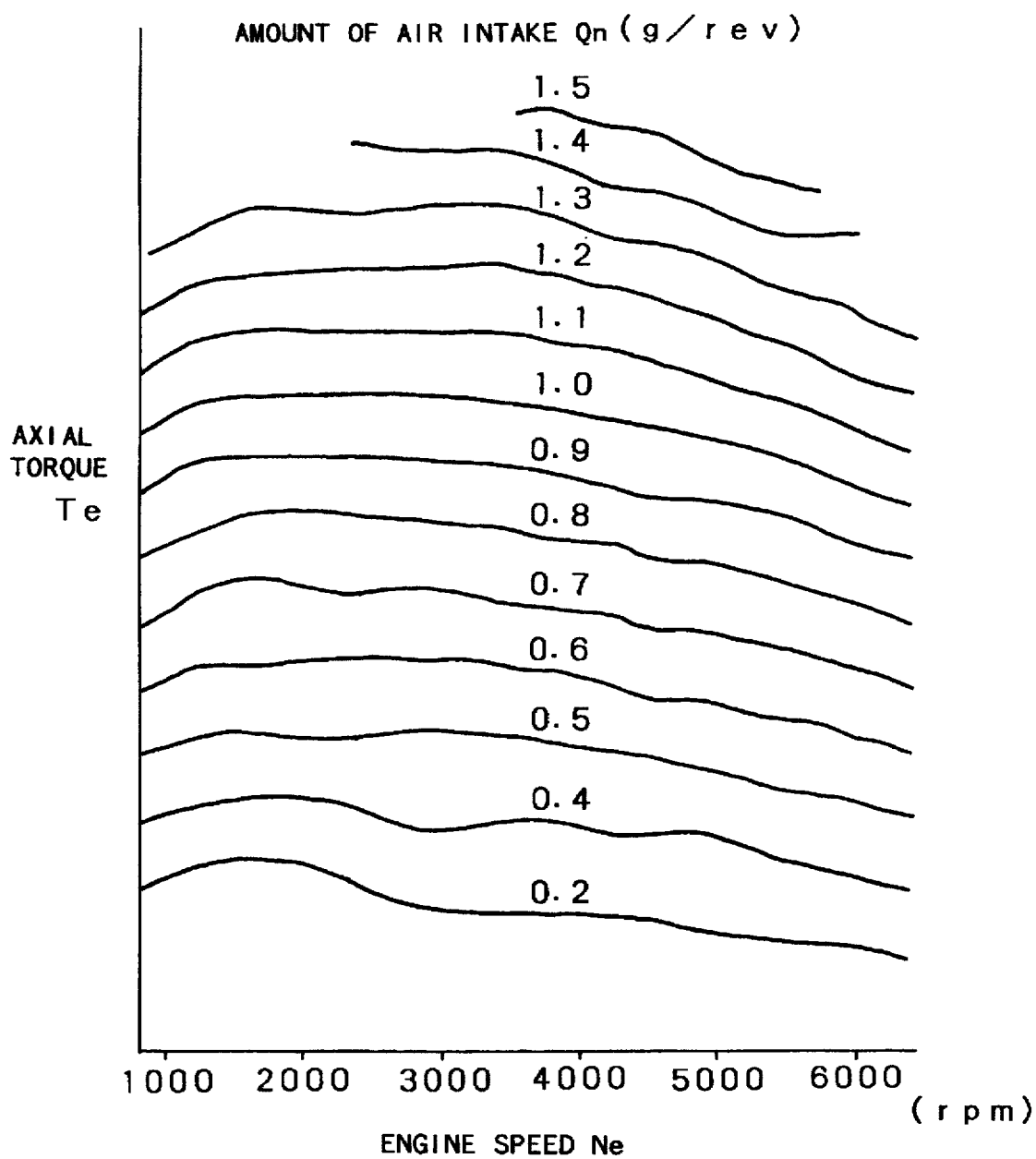
FIG. 31 is a graph used for determining an axial torque Te according to the engine speed Ne and the amount of air intake Qn.

The program enters the characteristic compensation routine and goes to step S400 at which the electronic control unit 42 reads data of the engine speed Ne and the amount of air intake Qn and determines an axial torque Te by referring to a map showing the relationship between the engine speed Ne, the amount of air intake Qn representing the loading condition of the engine 10, and the axial torque Te. FIG. 31 shows an example of the map referred to at step S400. Although the amount of air intake Qn is used as a parameter for determining the axial torque Te in this embodiment, any parameter representing the loading of the engine 10 may also be applicable. At step S401, a speed ratio ρ of the torque converter 12 is obtained. The speed ratio ρ represents a ratio of the input rotating speed to the output rotating speed of the torque converter 12 and is defined as Nin/Ne, wherein Nin is the input shaft rotating speed (rotating speed Nt of the turbine runner 22) and Ne is engine speed (rotating speed NP of the pump impeller 18).

Figure 32:
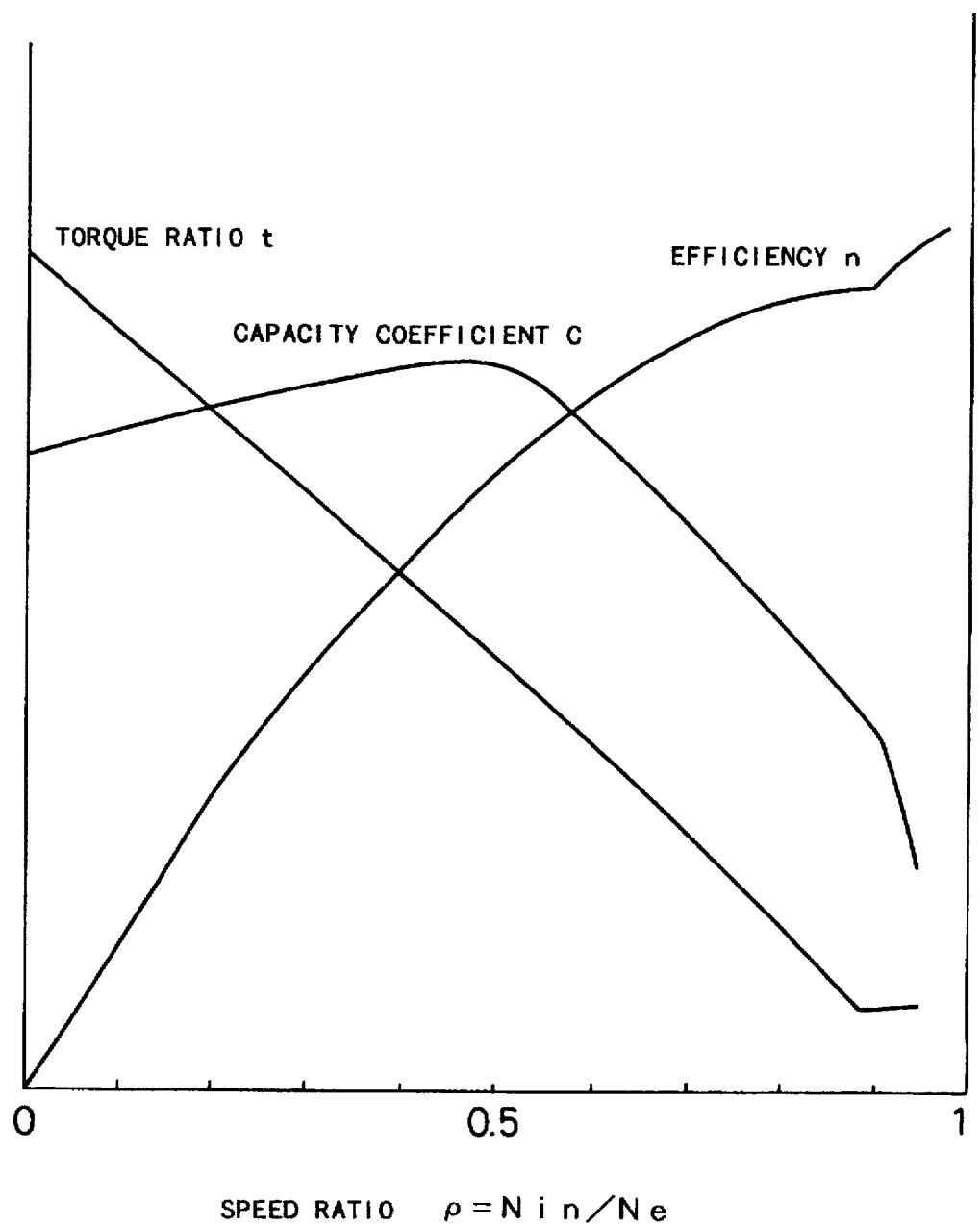
FIG. 32 is a graph used for determining a capacity coefficient C according to the speed ratio ρ.

The program then goes to step S402 at which the electronic control unit 42 determines a capacity coefficient C of the torque converter 12 by referring to a map of the capacity coefficient C plotted against the speed ratio ρ. FIG. 32 shows an example of the map referred to at step S402. A torque ratio t and an efficiency η are also plotted against the speed ratio ρ in the map of FIG. 32. A transmission torque Tc of the torque converter 12 is then determined with the capacity coefficient C at step S403. The transmission torque Tc is obtained by multiplying the capacity coefficient C by the second power of the engine speed Ne (Tc=C×Ne×Ne). A transmission torque TL of the lock-up clutch 32 is then determined at step S404 by subtracting the transmission torque Tc of the torque converter 12 from the axial torque Te.

Figure 33:
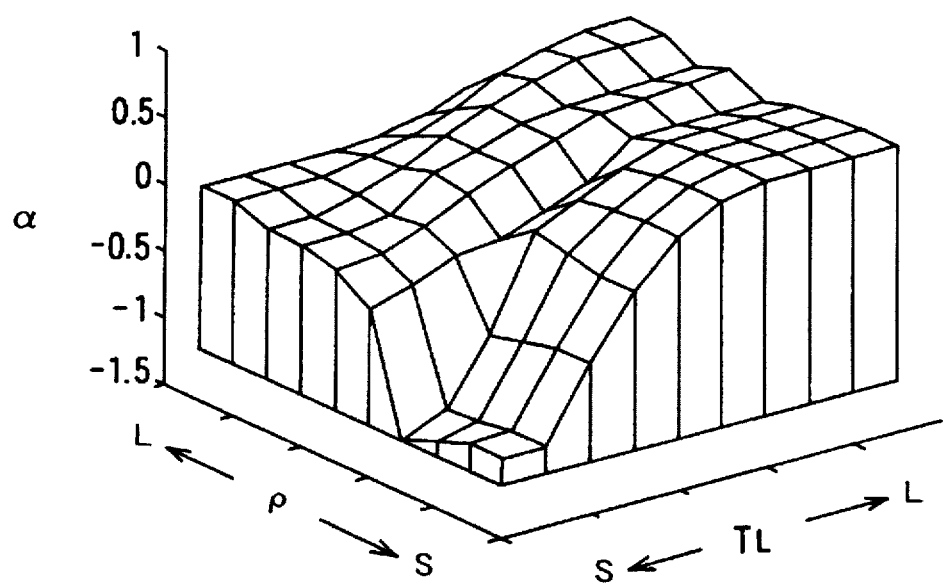
FIG. 33 shows a map used for determining the constant α based on the speed ratio ρ and the transmission torque TL of the lock-up clutch 32.
Figure 34:
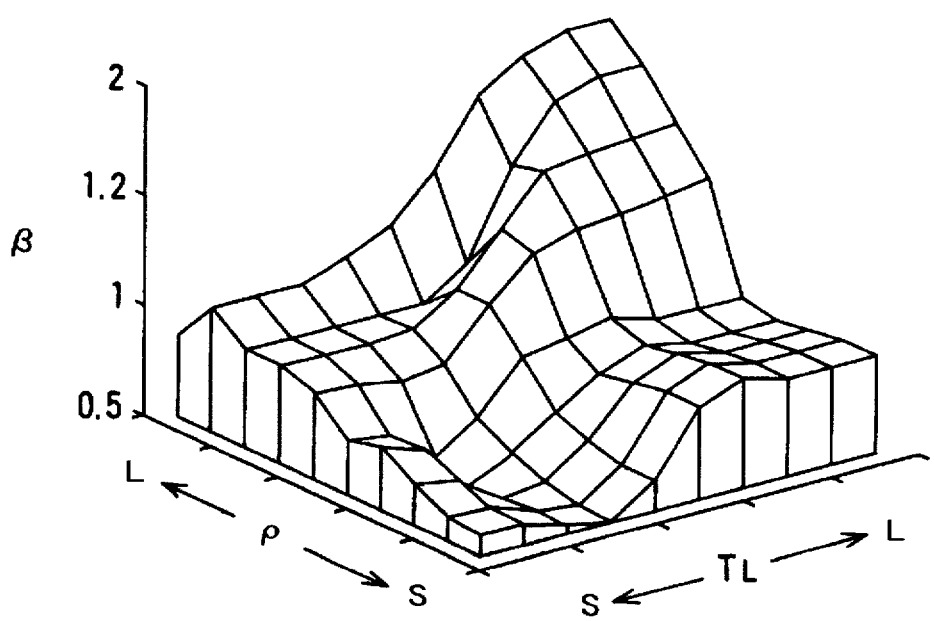
FIG. 34 shows a map used for determining the constant β based on the speed ratio ρ and the transmission torque TL of the lock-up clutch 32.

The program then proceeds to step S405 at which the electronic control unit 42 determines the constants α and β by referring to maps of the constants α and β plotted against the speed ratio ρ and the transmission torque TL of the lock-up clutch 32. FIGS. 33 and 34 show exemplified maps referred to at step S405. The constants α and β are set by referring to the three-dimensional maps of FIGS. 33 and 34 representing the relationships between the constants α and β, the speed ratio ρ, and the transmission torque TL of the lock-up clutch 32.

The third embodiment has the structure of the characteristic compensator CC identical with that of the second embodiment shown in FIG. 26, and executes the processes of steps S304 through S308 in the flowchart of FIG. 27 after the process of FIG. 30. Like the second embodiment, the structure of the third embodiment executes the actual operation for the difference of plant input and the filter operation with either one of the first filter FF and the second filter FS selected according to the sign of the constant α.

The slip control device of the third embodiment has effects like those of the first and the second embodiments. The third embodiment determines the constants α and β representing the characteristics of operations of the lock-up clutch 32, based on the transmission torque TL of the plant or the lock-up clutch 32 and the speed ratio ρ of the torque converter 12. This compensates for the characteristic perturbations accompanied with the variation in operation point of the plant with extremely high accuracy and precision.

Figure 35:
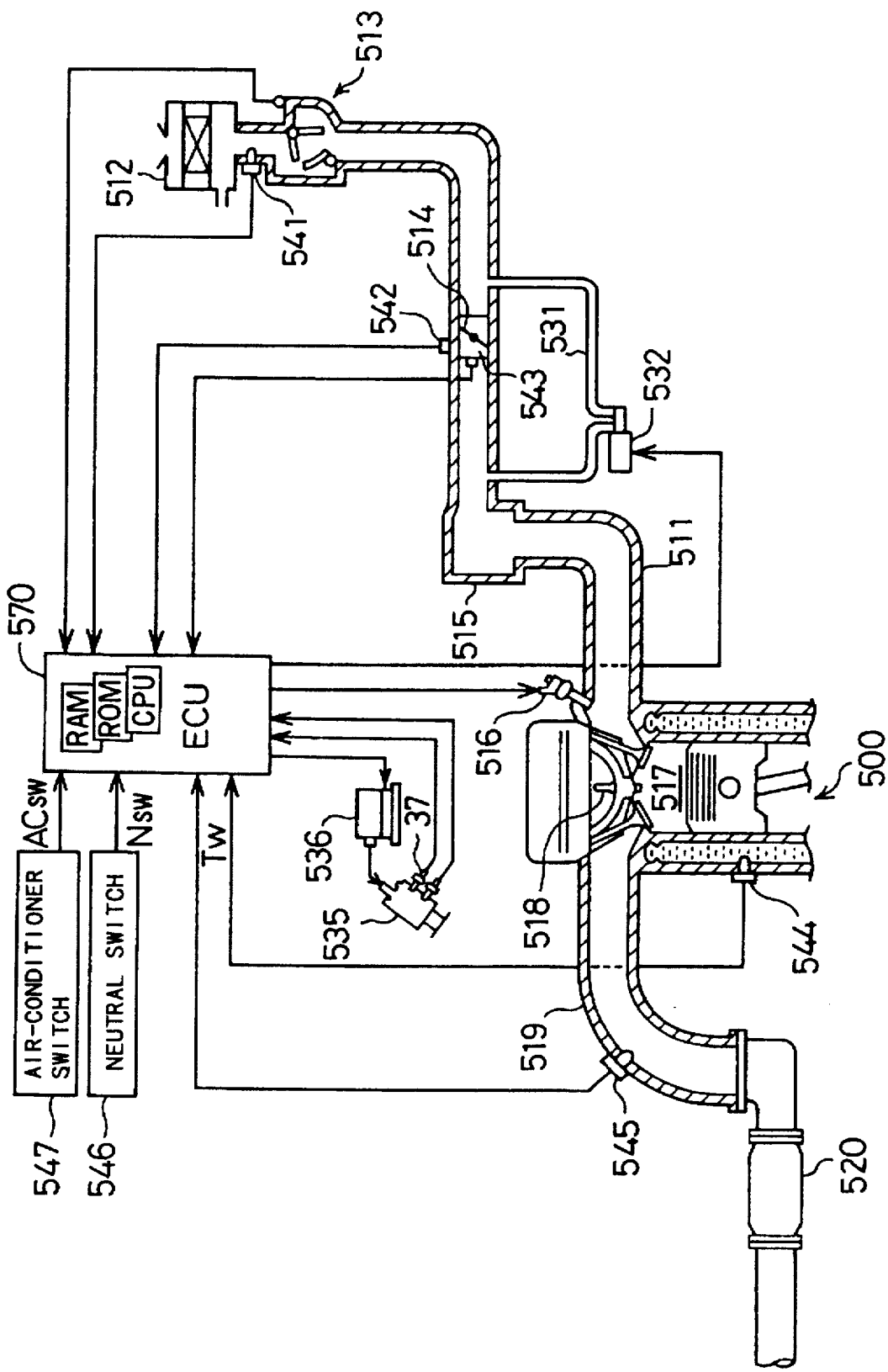
FIG. 35 schematically shows an idling speed control device as a fourth embodiment in accordance with the invention.

In a fourth embodiment, the principle of the invention is applied to idling speed control of a vehicle engine. FIG. 35 schematically shows an idling speed control device of the fourth embodiment with an engine 500 and peripheral elements. Referring to FIG. 35, an air inlet, an air cleaner 512, an air flowmeter 513, a throttle valve 514, a surge tank 515 for suppressing pulsations of intake air, and a fuel injection valve 516 for supplying fuel to the engine 500 are arranged in an intake conduit 511 of the engine 500. The intake air fed through the intake conduit 511 is mixed with fuel injected via the fuel injection valve 516, and supplied as the air/fuel mixture to a combustion chamber 517 of the engine 500. The air/fuel mixture is ignited with an ignition plug 518 in the combustion chamber 517 and exploded and combusted to drive the engine 500. Combustion byproducts generated in the combustion chamber 517 are sent to a catalytic converter 520 via an exhaust manifold 519 and discharged to the air after the purification by the catalytic converter 520.

High voltages from an igniter 536 are applied onto the ignition plugs 518 via a distributor 535. The timing of applying the high voltage determines the ignition timing. The distributor 535 distributes the high voltages generated from the igniter 536 to the ignition plugs 518 of the respective cylinders. A speed sensor 537 mounted on the distributor 535 outputs 24 pulse signals per rotation (two rotations of the crank shaft).

The intake conduit 511 also has a by-pass 531 which detours the main intake conduit with the throttle valve 514. An idling speed control valve (hereinafter referred to as ISCV) 532 is disposed in the by-pass 531. The ISCV 532 has a valve disc whose valve travel is controlled through solenoid operations, and controls the air flow supplied to the engine 500 under the full-close conditions of the throttle valve 514 or the idling conditions. The driving conditions of the engine 500 under the idling conditions are controlled by regulating the ISCV 532.

Sensors disposed on the engine 500 and the peripheral elements applied for detecting the driving conditions of the engine include the speed sensor 537, a throttle position sensor 543 for detecting the valve travel of the throttle valve 514 and having an idle switch 542 for detecting the full-close conditions of the throttle valve 514, an intake temperature sensor 541 disposed in the intake conduit 511 for detecting the temperature of intake air, the air flowmeter 513 for detecting the intake air flow, a water temperature sensor 544 disposed in a cylinder block for detecting the temperature of cooling water, an oxygen sensor 545 disposed in the exhaust manifold 519 for detecting the oxygen concentration in the combustion byproducts, a neutral switch 546 for detecting that a transmission is in the neutral position, and an air-conditioner switch 547 for detecting on/off of an air conditioner. Detection signals from these sensors are input into an electronic control unit (ECU) 570.

The ECU 570 is constructed as a logic/operation circuit including a known one-chip microcomputer. The ECU 570 includes a CPU for executing a variety of operations according to preset control programs to control the engine 500 and the peripheral elements, a ROM in which control programs and data required for the variety of operations by the CPU are previously stored, and a RAM which data required for the variety of operations by the CPU are temporarily written in or read out. The ECU 570 also includes an input/output port for inputting the detection signals sent from the sensors and a power circuit for supplying required voltages to the various constituents.

In the idling speed control device having the above hardware structure, the ECU 570 executes controls similar to those shown in the block diagram of FIG. 1. In the fourth embodiment, however, the target value setting unit RS receives signals representing a cooling water temperature Tw, a state ACsw of the air-conditioner switch 547, and a state Nsw of the neutral switch 546, while the operating condition evaluation unit OB receives inputs of the cooling water temperature Tw, a target idling engine speed Nid*, and the amount of air intake Qn. The ECU 570 executes an idling engine speed control routine shown in the flowchart of FIG. 36 and a characteristic compensation routine shown in the flowchart of FIG. 37 and realizes the controls similar to those of FIG. 1 except the above points.

Figure 36:
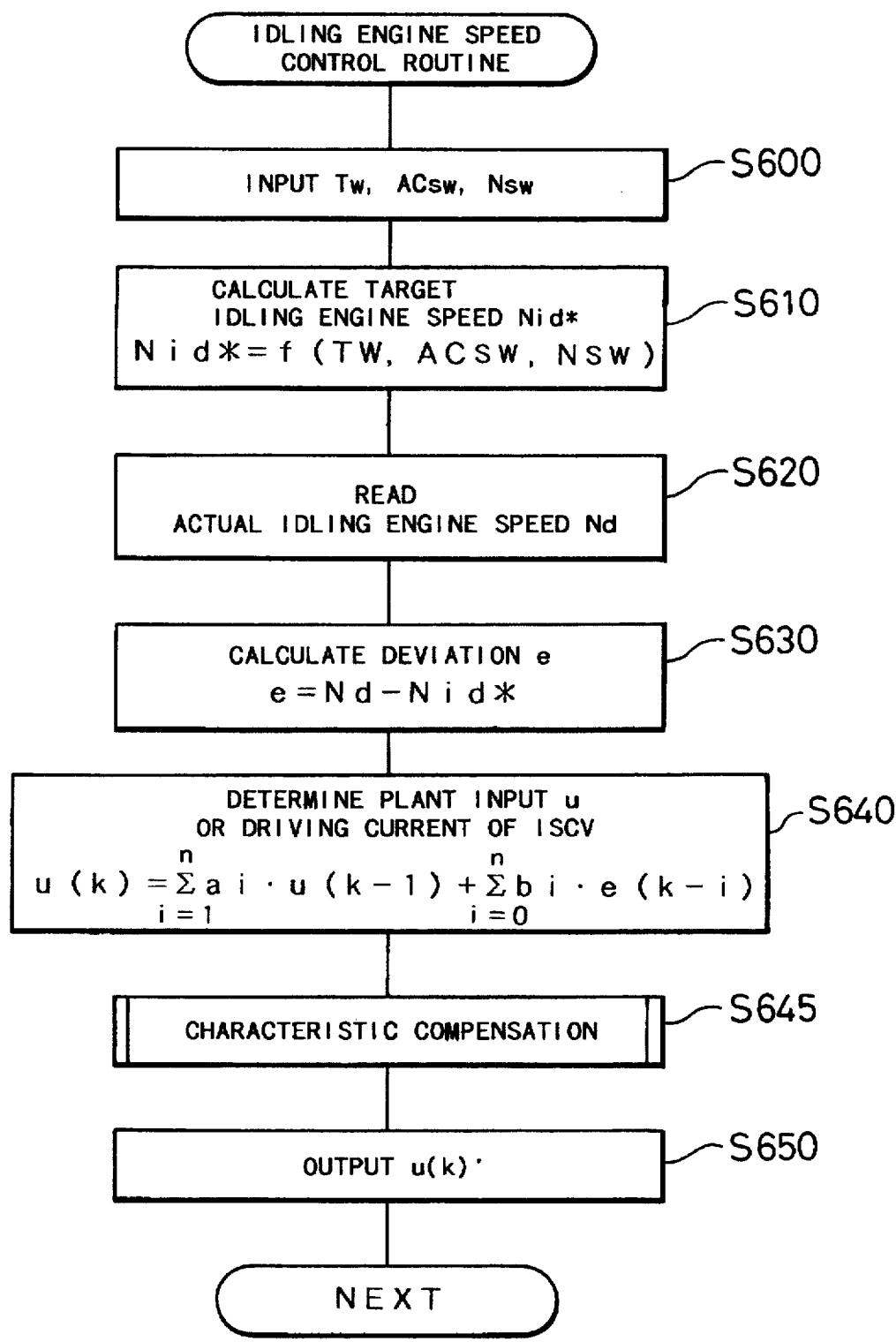
FIG. 36 is a flowchart showing an idling engine speed control routine executed in the fourth embodiment.

The program enters the idling engine speed control routine of FIG. 36, and first reads data of the cooling water temperature Tw, the state ACsw of the air-conditioner switch 547, and the state Nsw of the neutral switch 546 at step S600. The ECU 570 then calculates a target idling engine speed Nid* from these input data at step S610. A higher target idling engine speed Nid* is set for the lower cooling water temperature Tw or under the ON conditions of the neutral switch 546 or the air-conditioner switch 547. The target idling engine speed Nid* may be determined by referring to maps previously prepared and stored.

At step S620, the ECU 570 reads data of an actual idling engine speed Nd, which are typically detected by reading signals from the speed sensor 537. The program then goes to step S630 at which a deviation e is calculated by subtracting the target idling engine speed Nid* obtained at step S610 from the actual idling engine speed Nd read at step S620. At step S640, a plant input u corresponding to the driving current running through the ISCV 532 for controlling the amount of air intake under the idling conditions is determined according to Equation 2 given previously.

As expressed by Equation 2, a next plant input u(k) is determined as a total of summation of past plant inputs u(k-i) multiplied by a first controller coefficient ai and summation of past deviations e(k-i) multiplied by a second controller coefficient bi. The past plant inputs u(k-i) and the past deviations e(k-i) are obtained in the previous cycle through in the cycle executed n times before, and in the current cycle through in the cycle executed n times before, respectively. Although H∞ control is applied to calculate the plant input u(k) in accordance with Equation 2 in this embodiment, H∞ control is not essential to the principle of the invention and the conventional PID control may also be applicable. Details of the H∞ control including the determination of the coefficients ai and bi are described in the first embodiment. In this embodiment, the coefficients ai and bi are determined as n=5, that is, with data in the current cycle through in the cycle executed five times before. The following data show a design point for the idling engine speed control and the constants ai and bi at the design point in the embodiment.

Target idling engine speed Nid*=750 rpm
Temperature of cooling water Tw=80° C.
Amount of air intake Qn=0.08 gr/rev a1=−0.498, a2=1.066, a3=0.474, a4=0.0796, a5=0.00358 b0=0, b1=1.37, b2=−2.1451, b3=−1.8518, b4=0.7228, b5=0.6415

This process of determining the plant input u(k) corresponds to the plant input calculation unit OC in FIG. 1. The program subsequently goes to step S645 at which characteristic compensation is executed with respect to the plant input u(k) determined at step S640 to give a modified plant input u(k)'. The program proceeds to step S650 to output the modified plant input u(k)' to the ISCV 532 via the input/output port and goes to NEXT to exit from the routine.

Figure 37:
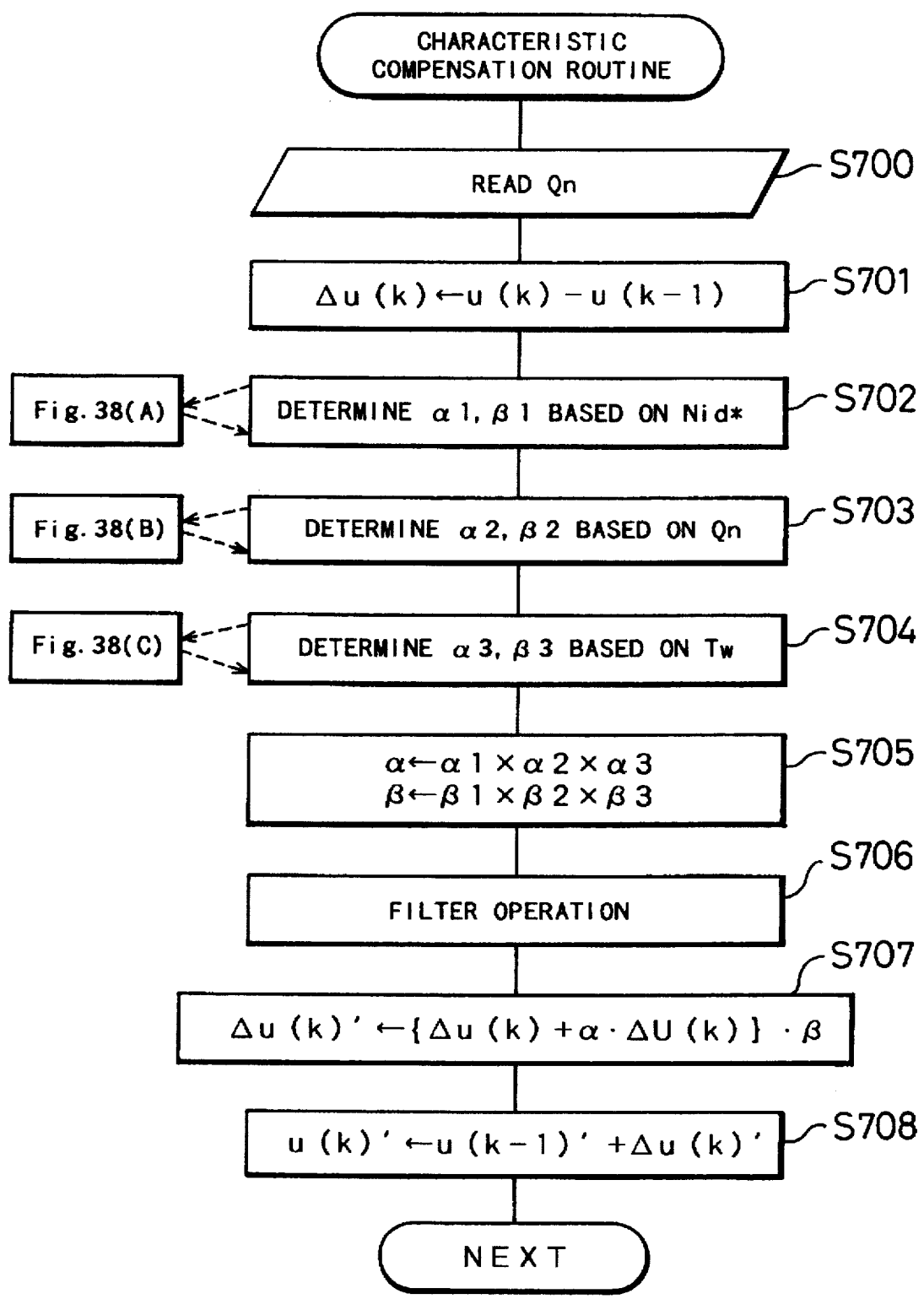
FIG. 37 is a flowchart showing a characteristic compensation routine executed in the fourth embodiment.

Details of the characteristic compensation executed at step S645 of FIG. 36 are shown in the flowchart of FIG. 37. The characteristic compensation process corresponds to the characteristic compensator CC shown in FIG. 1. The ECU 570 reads the amount of air intake Qn at step S700, and determines a difference of plant input Δu(k) at step S701 by subtracting a previous plant input u(k−1) from a current plant input u(k) determined at step S640 in the flowchart of FIG. 36. The difference of plant input has the smaller absolute value than the plant input itself, thereby improving the precision of operation. This process corresponds to the differential operation unit DC shown in FIG. 2.

At steps S702, S703, and S704, parameters α1, β1, α2, β2, α3, and β3 are determined by referring to maps of the target idling engine speed Nid* obtained at step S610 of FIG. 36, the amount of air intake Qn read at step S700 in the flowchart of FIG. 37, and the cooling water temperature Tw read at step S600 in the flowchart of FIG. 36. FIG. 38A shows a map applied to determine the parameters α1 and β1 based on the target idling engine speed Nid*; FIG. 38B is a map for determining the parameters α1 and β2 according to the amount of air intake Qn; and FIG. 38C is a map for determining the parameters α3 and β3 according to the cooling water temperature Tw. This process corresponds to the operating condition evaluation unit OB shown in FIG. 1.

At step S705, constants α and β are calculated from these parameters (α=α1×α2×α3, β=β1×β2×β3). The process of calculating the constants α and β corresponds to the constants operation unit PC shown in FIGS. 1 and 2. The program then proceeds to step S706 at which a filter operation is executed with respect to the difference of plant input Δu(k). At step S707, the ECU 570 calculates a modified difference of plant input Δu(k)' from an output ΔU(k) obtained at step S706, the difference of plant input Δu(k), and the constants α and β according to Equation 3 given previously. The process of filter operation corresponds to the filter operation unit FO shown in FIG. 2.

At step S708, a current modified plant input u(k)' is determined by adding a previous modified plant input u(k−1)' obtained in a previous cycle to the modified difference of plant input Δu(k)'. This process corresponds to the integral operation unit IC shown in FIG. 2. The modified plant input u(k)' thus obtained is output to the ISCV 532 at step S650 in the flowchart of FIG. 36.

The idling speed control device of the fourth embodiment realizes a control with respect to the idling engine speed as the plant, which is equivalent to the slip control of the first embodiment. The plant input calculation unit OC working as a controller realized in the ECU 570 recognizes the actual plant plus the characteristic compensator CC as an augmented plant EOB as shown in FIG. 1. The plant input calculation unit OC working as the controller to the augmented plant EOB determines a plant input on the assumption that the plant exists at a specific operation point or design point. The actual operation point of the plant receiving the plant input may, however, be deviated from the design point according to the driving conditions of the vehicle. The characteristic compensator CC compensates for characteristic perturbations due to the deviation. This means that the characteristic compensator CC compensates to allow the plant input calculation unit OC working as the controller to recognize the augmented plant EOB (actual plant +characteristic compensator CC) at the specific operation point or design point.

The idling speed control device of the fourth embodiment realizes controls with excellent stability and response over a wide operation range. The control device does not discretely vary the constants in the controller, thereby attaining sufficient stability and preferable response. Even when the operation point in the system of controlling the idling engine speed is varied abruptly due to the ON and OFF operations of the air conditioner, the control device stably controls the idling engine speed. The structure of this embodiment allows stable and high-speed controls against the abrupt change in target idling engine speed Nid*.

Although only one filter is used in the fourth embodiment (see FIG. 1), an alternative structure has a plurality of filters which are switched over each other like the second embodiment. The conventional PID control is also applicable, instead of the H∞ control, to determination of the plant input by the plant input calculation unit OC. In the PID control, the operation executed at step S640 in the flowchart of FIG. 36 is replaced by calculation expressed as Equation 19 above. In Equation 19, Kp, Ki, and Kd respectively denote a proportional coefficient of a deviation e from a target idling engine speed, an integral coefficient of the deviation e, and a differential coefficient of the deviation e. In the embodiment, Kp=2.7, Ki=0.45, and Kd=5.2.

There may be many modifications, alterations, and changes without departing from the scope or spirit of essential characteristics of the invention. It is thus clearly understood that the above embodiments are only illustrative and not restrictive in any sense. Examples of modification include: a structure of the conventional PID control in combination with a high-order low-pass filter for realizing operations equivalent to step S140 of FIG. 5 or step S640 of FIG. 36; a structure having multipliers exclusively used for these operations; and a structure having three or more filters.

The scope and spirit of the present invention are limited only by the terms of the appended claims.

What is claimed is:

1. A plant control device for calculating a plant input to be given to a plant, said control device comprising:

deviation detecting means for detecting a deviation of a controlled variable of said plant from a target value;

plant input calculating means for calculating a plant input corresponding to specified operation characteristics of said plant, based on said deviation detected by said deviation detecting means;

filter operation means for carrying out a filter operation with respect to said plant input calculated by said plant input calculating means, said filter operation being based on a variable representing an operation condition of said plant;

compensating means for activating said filter operation means to carry out said filter operation with respect to said plant input and compensating said plant input, in order to restrict frequency-dependent variations in phase and gain among a specified operation characteristics of said plant within a predetermined range and cancel said frequency-dependent variations in operation characteristics of said plant; and outputting means for outputting said compensated plant input to said plant and regulating said controlled variable of said plant to said target value.

2. A plant control device in accordance with claim 1, wherein said compensating means calculates a difference of plant input by subtracting a previous plant input obtained in a previous cycle from a current plant input obtained in a current cycle, compensates said difference of plant input, and generates and outputs a current compensated plant input by adding the compensated difference of plant input to a previous compensated plant input obtained in the previous cycle.

3. A plant control device in accordance with claim 1, wherein said plant input calculating means calculates the plant input based on past data of the plant input as well as the deviation.

4. A plant control device in accordance with claim 1, wherein said compensating means further comprises:

first multiplying means for multiplying a total of said plant input and a result of said filter operation by a correction factor, said correction factor being based on at least a stationary gain perturbation.

5. A plant control device in accordance with claim 4, wherein said filter operation means further comprises second multiplying means for multiplying said result of filter operation by a correction factor corresponding to a perturbation of specific operation characteristics of said plant.

6. A plant control device in accordance with claim 5, wherein said second multiplying means further comprises:

memory means for storing a plurality of parameters which represent operating conditions for respective divisions of said specific operation characteristics of said plant; and interpolating means for, when the division of said specific operation characteristics varies, interpolating a parameter from said plurality of parameters to obtain the correction factor and applying said correction factor for the multiplication by said second multiplying means.

7. A plant control device in accordance with claim 4, wherein said first multiplying means further comprises:

memory means for storing a plurality of parameters which represent operating conditions for respective divisions of said specific operation characteristics of said plant; and interpolating means for, when the division of said specific operation characteristics varies, interpolating a parameter from said plurality of parameters to obtain the correction factor and applying said correction factor for the multiplication by said first multiplying means.

8. A plant control device in accordance with claim 1, wherein said filter operation means utilizes an internal state variable of said plant as said variable representing said operating condition of said plant.

9. A plant control device for calculating a plant input to be given to a plant, said control device comprising:

deviation detecting means for detecting a deviation of a controlled variable of said plant from a target value;

plant input calculating means for calculating a plant input corresponding to specified operation characteristics of said plant, based on said deviation detected by said deviation detecting means;

filter operation means for carrying out a filter operation with respect to said plant input calculated by said plant input calculating means, said filter operation being based on a variable representing an operation condition of said plant;

compensating means for activating said filter operation means to carry out said filter operation with respect to said plant input and compensating said plant input, in order to control characteristics represented in phase and gain of a whole system comprising said filter operation means and said plant to a predetermined range, against frequency-dependent variations in phase and gain among a specified operation characteristics of said plant, thereby cancelling said frequency-dependent variations in operation characteristics of said plant; and outputting means for outputting said compensated plant input to said plant and regulating said controlled variable of said plant to said target value.

10. A plant control device in accordance with claim 9, wherein said filter operation means utilizes an internal state variable of said plant as said variable representing said operating condition of said plant.

11. A plant control device for calculating a plant input to be given to a plant, said control device comprising:

deviation detecting means for detecting a deviation of a controlled variable of said plant from a target value;

plant input calculating means for calculating a plant input corresponding to specified operation characteristics of said plant, based on at least said deviation detected by said deviation detecting means;

characteristic perturbation detecting means for detecting a perturbation of said plant from said specified operation characteristics;

compensating means for receiving the plant input calculated by said plant input calculating means, compensating the plant input to cancel said perturbation from the specified operation characteristics detected by said characteristic perturbation detecting means; and outputting means for outputting said compensated plant input to said plant, so as to regulate the controlled variable of said plant to the target value;

wherein said compensating means further comprises:

filter operation means for executing a filter operation with respect to said plant input, said filter operation being based on at least frequency-dependent phase and gain perturbations; and first multiplying means for multiplying a total of said plant input and a result of said filter operation by a correction factor, said correction factor being based on at least a stationary gain perturbation;

wherein said first multiplying means further comprises:

memory means for storing a plurality of parameters which represent operating conditions for respective divisions of said specific operation characteristics of said plant; and interpolating means for, when the division of said specific operation characteristics varies, interpolating a parameter from said plurality of parameters to obtain the correction factor and applying said correction factor for the multiplication by said first multiplying means.

12. A plant control device for calculating a plant input to be given to a plant, said control device comprising:

deviation detecting means for detecting a deviation of a controlled variable of said plant from a target value;

plant input calculating means for calculating a plant input corresponding to specified operation characteristics of said plant, based on at least said deviation detected by said deviation detecting means;

characteristic perturbation detecting means for detecting a perturbation of said plant from said specified operation characteristics;

compensating means for receiving the plant input calculated by said plant input calculating means, compensating the plant input to cancel said perturbation from the specified operation characteristics detected by said characteristic perturbation detecting means; and outputting means for outputting said compensated plant input to said plant, so as to regulate the controlled variable of said plant to the target value;

wherein said compensating means further comprises:

filter operation means for executing a filter operation with respect to said plant input, said filter operation being based on at least frequency-dependent phase and gain perturbations; and first multiplying means for multiplying a total of said plant input and a result of said filter operation by a correction factor, said correction factor being based on at least a stationary gain perturbation;

wherein said filter operation means further comprises second multiplying means for multiplying said result of filter operation by a correction factor corresponding to a perturbation of specific operation characteristics of said plant;

wherein said second multiplying means further comprises:

memory means for storing a plurality of parameters which represent operating conditions for respective divisions of said specific operation characteristics of said plant; and interpolating means for, when the division of said specific operation characteristics varies, interpolating a corresponding parameter from said plurality of parameters to obtain the correction factor and applying said correction factor for the multiplication by said second multiplying means.

13. A slip control device for calculating a plant input of an actuator constituting a control system for controlling a slip of a clutch mounted on a vehicle, said slip control device comprising:

characteristic perturbation detecting means for detecting a perturbation of the control system for controlling the clutch slip from specified operation characteristics;

slip deviation detecting means for detecting a deviation of an actual slip of said clutch from said target slip;

plant input calculating means for calculating a plant input corresponding to said specified operation characteristics of said control system, based on at least said deviation detected by said slip deviation detecting means;

filter operation means for carrying out a filter operation with respect to said plant input calculated by said plant input calculating means, said filter operation being based on a variable representing an operation condition of the actuator;

compensating means for receiving the plant input calculated by said plant input calculating means, activating said filter operation means with respect to said plant input and compensating the plant input, in order to restrict frequency dependent variations in phase and gain among specified operation characteristics of said actuator within a predetermined range and cancel said perturbation of operation characteristics detected by said characteristic perturbation detecting means; and outputting means for outputting said compensated plant input to said actuator, so as to regulate a slip of the clutch to a target slip.

* * * * *